(12) United States Patent
Bilbao De Mendizabal et al.

(10) Patent No.: US 11,255,698 B2
(45) Date of Patent: Feb. 22, 2022

(54) MAGNETIC POSITION SENSOR ARRANGEMENT

(71) Applicant: Melexis Technologies SA, Bevaix (CH)

(72) Inventors: Javier Bilbao De Mendizabal, Zurich (CH); Christian Schott, Lussy-sur-Morges (CH); Lionel Tombez, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 16/874,077

(22) Filed: May 14, 2020

(65) Prior Publication Data

US 2020/0370924 A1 Nov. 26, 2020

(30) Foreign Application Priority Data

May 21, 2019 (EP) .................................. 19175668

(51) Int. Cl.
*G01D 5/14* (2006.01)
*G01D 18/00* (2006.01)

(52) U.S. Cl.
CPC .............. *G01D 5/145* (2013.01); *G01D 18/00* (2013.01)

(58) Field of Classification Search
CPC ................................ G01D 5/145; G01D 18/00
See application file for complete search history.

(56) References Cited

U.S. PATENT DOCUMENTS

| | | | |
|---|---|---|---|
| 5,861,747 A * | 1/1999 | Kubinski | G01D 5/145 324/207.21 |
| 6,288,533 B1 | 9/2001 | Haeberli et al. | |
| 8,878,524 B2 | 11/2014 | Heberle | |
| 2013/0099777 A1 * | 4/2013 | Heberle | G01D 5/145 324/207.2 |
| 2018/0106642 A1 | 4/2018 | Schliesch | |
| 2019/0086238 A1 * | 3/2019 | Moriyama | F16C 41/007 |
| 2019/0186955 A1 * | 6/2019 | Wallrafen | G01D 5/24438 |
| 2019/0383644 A1 * | 12/2019 | Marauska | G01B 7/30 |

FOREIGN PATENT DOCUMENTS

| | | |
|---|---|---|
| DE | 69816755 T2 | 6/2004 |
| EP | 2584304 A1 | 4/2013 |
| WO | 9854547 A1 | 12/1998 |
| WO | WO-2017140495 A1 * | 8/2017 ............. G01D 5/145 |

OTHER PUBLICATIONS

Extended European Search Report from corresponding EP Application No. 19175668.3, dated Oct. 23, 2019.

* cited by examiner

*Primary Examiner* — Clayton E. LaBalle
*Assistant Examiner* — Michael A Harrison
(74) *Attorney, Agent, or Firm* — Workman Nydegger

(57) ABSTRACT

A position sensor arrangement, comprising: a magnetic source and a position sensor device movably arranged relative to each other; the latter comprising at least three magnetic sensors for measuring said magnetic field; a processing unit for determining a position based on a ratio of a first pairwise difference and a second pairwise difference, the first pairwise difference being a difference of a first pair of two signals, the second pairwise difference signal being a difference of a second pair of two signals. A method of determining a position, by performing said measurements, and by calculating said differences and said ratio. A method of calibrating said position sensor, including the step of storing at least one parameter or a look-up table in a non-volatile memory. A method of auto-calibration.

28 Claims, 22 Drawing Sheets

MAGNETIC POSITION SENSOR ARRANGEMENT

FIELD OF THE INVENTION

The present invention relates to magnetic position sensor arrangements comprising: a magnetic source (e.g. a permanent magnet) and a position sensor comprising at least three magnetic sensors.

BACKGROUND OF THE INVENTION

Sensor arrangements, in particular linear or angular position sensor arrangements are known in the art. In such arrangements typically a non-uniform magnetic field is generated (e.g. by means of a static electrical current, or by means of a permanent magnet) and is measured by a sensor device comprising one or more sensors and a readout circuit and a processor which calculates a linear or angular position based on the measured values.

Various sensor arrangements and various techniques for determining an angular position are known in the art, each having its advantages and disadvantages, for example in terms of cost, compactness, angular range, accuracy (e.g. signal-to-noise), signal sensitivity, robustness against unwanted external fields, robustness against position errors (e.g. axial and/or radial offset of the sensor versus the magnet), processing complexity, etc.

There is always room for improvements or alternatives.

SUMMARY OF THE INVENTION

It is an object of embodiments of the present invention to provide a position sensor device and to a position sensor arrangement comprising such a position sensor device, capable of measuring a (e.g. linear or angular) position of said sensor device relative to a magnetic source.

It is an object of embodiments of the present invention to provide such a position sensor device or arrangement comprising at least three magnetic sensors, or only three magnetic sensors, or at least four magnetic sensors, or only four magnetic sensors.

It is an object of embodiments of the present invention to provide such a position sensor device or arrangement capable of measuring a position in a manner which is highly insensitive to an external disturbance field, and/or ageing effects, and/or demagnetisation effects, and preferably all of these.

It is an object of embodiments of the present invention to provide such a position sensor device or arrangement where dimensions of the sensor device and dimensions of the magnetic source can be chosen largely independently without significantly decreasing accuracy.

It is an object of embodiments of the present invention to provide such a position sensor device or arrangement where mounting requirements of the sensor device relative to the magnetic source are considerably relaxed.

It is an object of embodiments of the present invention to provide such a position sensor device or arrangement where calibration time can be reduced, or where calibration can be completely eliminated.

It is an object of embodiments of the present invention to provide such a position sensor device or arrangement where the device is capable of performing an auto-calibration, such that the device can be mounted with highly relaxed mounting requirements, without substantially decreasing the accuracy of the measurement.

It is an object of embodiments of the present invention to provide such a position sensor device or arrangement suitable for functional safety applications.

It is also an object of embodiments of the present invention to provide a method of determining a position of a magnetic sensor device relative to a magnetic source.

It is also an object of embodiments of the present invention to provide a method of calibrating a sensor arrangement comprising a magnetic sensor device movably mounted relative to a magnetic source.

These and other objects are accomplished by a position sensor arrangement, a position sensor, and methods according to embodiments of the present invention.

According to a first aspect, the present invention provides a position sensor arrangement, comprising: a magnetic field source for generating a magnetic field having at least two poles; a position sensor device movably arranged relative to the magnetic field source or vice versa, and comprising: at least three magnetic sensors, including a first sensor and a second sensor and a third sensor, each adapted for measuring a respective value of said magnetic field; the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal; the first, second and third magnetic sensor being arranged such that the second magnetic sensor (S2) is located substantially between the first magnetic sensor (S1) and the third magnetic sensor (S3), and such that the first, second and third magnetic sensor are arranged on a straight line or at the corners of an imaginary triangle having a height (H) over base (B) ratio in the range from 1% to 45%; a processing unit connected to the at least three magnetic sensors for obtaining the first, second and third signal, and configured for determining a position of the position sensor relative to the magnetic field source based on a ratio of a first pairwise difference and a second pairwise difference, the first pairwise difference being a difference of a first pair of two signals selected from said first, second and third signal, and the second pairwise difference signal being a difference of a second pair of two signals selected from said first, second and third signal, the second pair being different from the first pair, and one of the first, second and third signal being used both in the first pair and in the second pair.

It is an advantage of this embodiment that it allows to calculate a position of the sensor relative to the magnetic field source in a manner which is highly insensitive to an external disturbance field (also know as "fremdfeld" or "strayfield").

It is an advantage of this embodiment that the first difference signal is a difference between only two signals (e.g. H1−H2), and the second difference signal is a difference between only two signals (e.g. H2−H3), which is extremely simple to calculate, and which does not require a multiplication or amplification in the analog domain.

It is an advantage of this embodiment that due to said ratio, the measured value is inherently robust against ageing, e.g. due to demagnetisation or temperature effects, and is highly insensitive to distance variations of the sensor with respect to the magnetic source (e.g. permanent magnet).

The present invention is based on the insight that this ratio uniquely defines a position within an envisioned measurement range, even if the difference signals DIFF1, DIFF2 are not 90° phase shifted, and even if the amplitude of DIFF1 and DIFF2 are not substantially the same. As far as is known to the inventors, this insight is not known, and there is a common believe or prejudice in the field that quadrature signals are required in order to calculate an accurate position.

In an embodiment, the signal being used in both the first and second difference is the signal provided by the second sensor, located substantially in the middle between the first and third sensor when located on a straight line, or located substantially at the top of said triangle.

In an embodiment, the signal being used in both the first and second difference is the signal provided by the first or third sensor, located at an outer position when located on a straight line, or located at the base in case of a triangle.

In an embodiment, the three sensors are located on a straight line, and the second magnetic sensor is located substantially in the middle between the first magnetic sensor and the third magnetic sensor.

In an embodiment, DIFF1=±(H1−H2) and DIFF2=±(H3−H2), and R=DIFF1/DIFF2.

In an embodiment, DIFF1=±(H1−H3) and DIFF2=±(H3−H2), and R=DIFF1/DIFF2.

In an embodiment, DIFF1=±(H1−H3) and DIFF2=±(H1−H2), and R=DIFF1/DIFF2.

In an embodiment, DIFF1=±(H2−H3) and DIFF2=±(H1−H2), and R=DIFF1/DIFF2.

In an embodiment, DIFF1=±(H1−H2) and DIFF2=±(H1−H3), and R=DIFF1/DIFF2.

In an embodiment, DIFF1=±(H2−H3) and DIFF2=±(H1−H3), and R=DIFF1/DIFF2.

The magnetic field source may have a plurality of alternating poles.

In an embodiment, the magnetic position sensor comprises exactly three magnetic sensors.

In an embodiment, the magnetic position sensor comprises exactly four magnetic sensors.

In an embodiment, the magnetic position sensor comprises at most four magnetic sensors.

In an embodiment, the magnetic field source is a permanent magnet.

In an embodiment, the magnetic field source is a disk magnet or a ring magnet or a substantially linear magnetic strip.

In an embodiment, the magnetic field source has at least four poles (e.g. a quadrupole), or at least six poles, or at least eight poles.

In an embodiment, the magnetic field source is an axially magnetized four-pole or six-pole disk magnet or ring magnet, for generating a rotation symmetric field, repeating after 90° or after 60° angular rotation.

In an embodiment, the outer two sensors elements are exposed to opposite poles of the magnetic field source.

In an embodiment, the first, second, and third magnetic sensor are integrated on a single semiconductor substrate. The processing unit may also be integrated on said semiconductor substrate or can be implemented on another semiconductor circuit. Said single semiconductor substrate or said single and another semiconductor substrate may be integrated in a single package (also referred to as "IC" or "chip").

The sensor device preferably contains a semiconductor substrate.

In some embodiments, the sensor elements are Hall elements, preferably integrated in said semiconductor substrate.

In some embodiments, the sensor elements are horizontal Hall elements. These horizontal Hall elements are preferably integrated in said semiconductor substrate.

In some embodiments, the sensor elements are vertical Hall elements. These vertical Hall elements are preferably integrated in said semiconductor substrate.

In an embodiment, the first, second and third magnetic sensor are located relative to the magnetic field source in such a way that the second signal is substantially equal to the first signal but phase shifted over a first predefined offset, and such that the third signal is substantially equal to the second signal but phase shifted over a second predefined offset.

The value of the first and second predefined offset $\varepsilon 1$, $\varepsilon 2$ may be determined explicitly, e.g. during a calibration test, e.g. by moving or turning the magnetic source relative to the sensor (or vice versa), and by determining a physical linear or angular distance between zero crossings of the signals (H1, H2, H3) and/or between zero crossings of the difference signals DIFF1, DIFF2, and to build e.g. a look-up table with two columns, one or ratio-values and one for a corresponding (linear or angular) distance. But that is not absolutely required, and the values of the ratio and corresponding distance can also simply be stored in a look-up table, without explicitly determining the offset values $\varepsilon 1$, $\varepsilon 2$.

In an embodiment, a first distance between the first sensor and the second sensor is substantially equal to a second distance between the second sensor and the third sensor.

In an embodiment, the first predefined offset is substantially equal to the second predefined offset.

It is explicitly pointed out that embodiments of the present invention also work if the first predefined offset is not equal to the second predefined offset. In this case, however, it may not be possible to use explicit mathematical expressions to calculate the linear or angular position, but it is perfectly possible to use at least one look-up table.

In an embodiment, the processing unit is adapted for calculating said relative position based on the formula: $\theta=\arctan(R)$, wherein R=DIFF1/DIFF2, and DIFF1=(H1−H2) or DIFF1=(H2−H1), and DIFF2=(H3−H2) or DIFF2=(H2−H3). This is particularly useful when each of the first predefined offset and the second predefined offset is equal to about 90°.

In addition to the advantages already mentioned above (insensitive to ageing and temperature effects and external field disturbances), it is a further advantage of this embodiment that the relative position can be calculated in an extremely simple manner, e.g. using a goniometric function, or using a look-up table and optional interpolation.

It is noted that in this embodiment, the dimensions of the magnetic sensor and the dimensions of the magnetic source need to substantially match each other, and that the mounting tolerances are limited, for accurate results.

Embodiments of the present invention are particularly useful in resolver applications or motor driver applications.

In an embodiment, the processing unit is adapted for calculating said relative position based on the formula: $\theta=\arctan(R/C\pm T)$, wherein R=DIFF1/DIFF2, and DIFF1=(H1−H2) or DIFF1=(H2−H1), and DIFF2=(H3−H2) or DIFF2=(H2−H3) and C is a predefined constant different from 1.0, and/or T is a predefined constant different from 0.0. This is particularly useful when the first predefined offset and the second predefined offset are a value in the range from 5° to 85°, or in the range from 95° to 175°, or in the range from 10° to 80°, or in the range from 100° to 170°, or in the range from 20° to 70°, or in the range from 110° to 160°.

In an embodiment, C is smaller than 0.95 and T is larger than 0.05.

In an embodiment, C is smaller than 0.95 and T is smaller than −0.05.

With arctan(R/C±T) is meant arctan(R/C+T) or arctan(R/C−T).

In addition to the advantages already mentioned above (insensitive to ageing and temperature effects and external field disturbances), it is a further advantage of this embodiment that the relative position can be calculated using an analytical function (thus no iterations are required).

It is a major advantage of this embodiment that the dimensions of the magnetic sensor and the dimensions of the magnetic source do not need to match each other. This makes it possible that the size of the sensor is reduced (as is typically the case with semiconductor devices), while the magnetic source (e.g. in the form of a permanent magnet) remains unchanged. This can have huge impact on cost, especially when taking into account that a single sensor device can now be used for a large number of magnetic sources (e.g. magnets) having various dimensions, and even having different number of poles.

It is also a major advantage of this embodiment that the mounting position of the sensor and the magnetic source can be drastically relaxed. In other words, this sensor arrangement is less sensitive to mounting position errors or deviations (from the intended position).

The values of C and T may be predefined, e.g. determined during design, or may be determined by a calibration test, or in certain embodiments (e.g. with at least four sensors) can even be determined automatically or semi-automatically in-situ (as will be described further).

The values of C and T may be hardcoded (e.g. stored in flash); or may be determined during a calibration test, and stored in a non-volatile memory of the sensor, and obtained from said non-volatile memory during actual use; or the value may be determined in situ, and stored in a volatile memory (e.g. RAM).

The embodiment where the sign function is used, rather than an arctangent function is particularly useful in resolver applications or motor driver applications, where the exact angular position is not required, but where it is sufficient to know whether the sensor is above a north pole or a south pole.

In an embodiment, the value of C and T are calculated based on the following formulas:
$C=\cos(\varphi)$, and $T=\tan(\varphi)$, wherein $\varphi$ is a constant value different from 0°, for example a value larger than 5° or larger than 10° or larger than 15°.

The values of $\varphi$ may be predefined, e.g. determined during design, or may be determined by a calibration test, or may be determined automatically or semi-automatically in-situ.

The values of $\varphi$ may be hardcoded (e.g. stored in flash); or may be determined during a calibration test, and stored in a non-volatile memory of the sensor, and obtained from said non-volatile memory during actual use; or the value may be determined in situ, and stored in a volatile memory (e.g. RAM).

In an embodiment, the value of $\varphi$ is calculated as $\varphi=(90°−\alpha)$, where $\alpha$ is the phase shift between the sensor signals.

In an embodiment, the value of $\varphi$ is larger than 5°, or larger than 10°, or larger than 15°.

In an embodiment, the magnetic position sensor further comprises at least a fourth magnetic sensor adapted for measuring a respective value of said magnetic field, and having a fourth axis of maximum sensitivity parallel to the first axis and configured for providing a fourth signal, wherein the fourth sensor is arranged such that the third magnetic sensor is located substantially between the second magnetic sensor and the fourth magnetic sensor, and such that the first, second, third and fourth sensor are arranged at the corners of an imaginary trapezium having a height over base ratio smaller than 30%, (the base being defined by the outer sensors, the height being defined by a minimal distance between the central sensors and the base); wherein the processing unit is further connected to the fourth magnetic sensors for obtaining the fourth signal.

In an embodiment, the third distance between the third sensor and the fourth sensor is substantially equal to the first distance between the first sensor and the second sensor.

In an embodiment, the processing unit is adapted for determining a first value indicative of the relative position of the position sensor based on the first, second and third signal obtained from the first, second and third magnetic sensor; and the processing unit is adapted for determining a second value indicative of the relative position of the position sensor based on the second, third and fourth signal obtained from the second, third and fourth magnetic sensor.

It is an advantage of this embodiment that it actually has two sets of three magnetic sensors. This can can be exploited in beneficial way.

The processing unit may be further adapted for calculating an average of the first and second value, and for providing this average value as the position value.

It is an advantage of this embodiment that it may reduce signal-to-noise ratio (SNR), and/or may reduce the influence of local defects in the magnetic structure (e.g. permanent magnet).

The processing unit may be further adapted for comparing the first and the second value, and for providing an error signal if these values deviate more than a predefined value.

It is an advantage of this embodiment that it has error-detection capabilities, which can be used e.g. for functional safety purposes.

In an embodiment, the processing unit is further adapted for calculating a second ratio of a third difference being a difference between the two signals from the outer sensors, and a fourth difference being a difference between the two signals from the inner sensors; and the processing unit is further adapted for determining a value of the constants C and the constant T based on this second ratio. In addition to the advantages already mentioned above, it is a major advantage of this embodiment that the value of C and T and/or $\varphi$ can be determined (or fine-tuned or updated) in situ, and that no calibration test is required during production. Depending on the specific implementation, the value(s) thus determined may be stored in volatile or non-volatile memory, or may be provided to and/or received from an external processor (e.g. an ECU).

In an embodiment, the processing unit is further adapted for calculating a second ratio of a third difference being a difference between the two signals from the outer sensors, and a fourth difference being a difference between the two signals from the inner sensors; and the processing unit is further adapted for determining a value of the above mentioned constant $\varphi$, based on this second ratio.

It is a major advantage that the constant $\varphi$ can be calculated based on difference signals obtained from sensors having sensitivity axes which are parallel, thus in a manner which is highly insensitive to an external disturbance field.

In an embodiment the second ratio R2 is calculated as R2=(H4−H1)/(H3−H2), and the value of $\alpha$ is be calculated or estimated based on the following formula α=90°−arcsin ((R2−1)/2), or using a look-up table.

In an embodiment, the at least three magnetic sensors are substantially located on a straight line.

In an embodiment, the magnetic field source is a permanent magnet in the form of a disk magnet or a ring magnet, movable about a shaft, and said straight line is oriented substantially perpendicular to the shaft (e.g. as crossing lines, not intersecting lines). The first, second is and third sensor may be adapted for measuring a magnetic field component oriented in a direction parallel to the shaft. Alternatively, the second axis of maximum sensitivity may be oriented substantially radially to said shaft (and intersect the shaft). Alternatively, the second axis of maximum sensitivity may be oriented substantially tangential to an imaginary circle having a centre located on said shaft.

In an embodiment, the magnetic sensor has four magnetic sensors substantially located on a straight line. This embodiment is particular suitable for a linear sensor arrangement but can also be used for an angular sensor arrangement.

In an embodiment, the first, second and third magnetic sensor are located at the corners of an imaginary triangle, having a base and a height, and a height over base ratio in the range from 1% to 40%.

The height over base ratio may be smaller than 40%, or smaller than 30%, or smaller than 25%, or smaller than 20%. The height over base ratio may be larger than 5%, or larger than 10%, or larger than 15%.

It is an advantage of this embodiment that it can reduce a difference between the amplitudes of the first, second and third signal (and if present, the fourth signal), and thereby further improve accuracy (for a given mounting position). Or stated differently, this sensor can be used with a wider range of magnetic sources having various dimensions. Or stated differently, a sensor arrangement with this sensor is more tolerant to position offset.

The first, second and third sensor may be integrated on a semiconductor substrate, and may be adapted for measuring a magnetic field component (Bz) perpendicular to said substrate.

In an embodiment having at least four magnetic sensors, the second, third and fourth magnetic sensor are located on a second imaginary triangle having a base (B) and a height (H), the height being smaller than 40% or 30% or 25% or 20% of the base (B), but preferably more than 5% or 10% or 15%.

In an embodiment having four magnetic sensors, the first, second, third and fourth magnetic sensor are located at the corners of an imaginary trapezoidal shape having a base (B) and a height (H), the height being smaller than 30% or 25% or 20% or 15% or 10% of the base (B), but preferably larger than 3% or larger than 5%, or larger than 7%.

In an embodiment, the magnetic position sensor arrangement is a linear position sensor arrangement, and the position sensor is adapted for determining a position along a linear trajectory.

In an embodiment, the magnetic position sensor arrangement is an angular position sensor arrangement, and the position sensor is adapted for determining an angular position of the magnetic source relative to the sensor.

In an embodiment, the magnetic source may be a permanent magnet in the form of a disk magnet or a ring magnet, and the at least three magnetic sensors may be oriented such that their axes of maximum sensitivity are parallel to the rotation axis of said ring magnet or disk magnet. The magnetic sensors may be or may comprise at least one horizontal Hall sensor element.

According to a second aspect, the present invention also provides a position sensor device, comprising: at least three magnetic sensors including a first sensor and a second sensor and a third sensor, the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal; the first, second and third magnetic sensor being arranged on a straight line or at the corners of an imaginary triangle having a height over base ratio in the range from 1% to 45% or in the range from 2% to 45% or in the range from 5% to 45%; a processing unit connected to the at least three magnetic sensors for obtaining the first, second and third signal, and configured for determining a position of the position sensor device relative to the magnetic field source based on a ratio of a first pairwise difference and a second pairwise difference, the first pairwise difference being a difference of a first pair of two signals selected from said first, second and third signal, and the second pairwise difference signal being a difference of a second pair of two signals selected from said first, second and third signal, the second pair being different from the first pair, one of the first, second and third signal being used both in the first pair and in the second pair.

In an embodiment, the three sensors are located on a straight line, and the second magnetic sensor is located substantially in the middle between the first magnetic sensor and the third magnetic sensor.

According to a third aspect, the present invention also provides a method of determining a position of a position sensor device according to the second aspect relative to a magnetic field source having at least two poles, the method comprising the steps of: a) measuring a first, second and a third value of said magnetic field by means of the first, second and third sensor respectively; b) calculating a first pairwise difference as a difference between a first pair of two signals selected from said first, second and third signal, and calculating a second pairwise difference signal as a difference between a second pair of two signals selected from said first, second and third signal, the second pair being different from the first pair, and one of the first, second and third signal being used both in the first pair and the second pair; c) calculating a ratio of the first difference and the second difference; d) determining the position based on said ratio.

Step d) may comprise determining said position by making use of a look-up table (e.g. stored in the sensor device), and/or by using one or more mathematical formula(s).

According to a fourth aspect, the present invention also provides a method of calibrating a position sensor device according to the second aspect, and movably mounted relative to a magnetic field source adapted for generating a magnetic field having at least two magnetic poles; the method comprising the steps of: a) bringing the position sensor and the magnetic source in a known relative position, and measuring at least a first, a second and a third value using the first, second and third magnetic sensor; b) calculating a first pairwise difference as a difference between a first pair of two signals selected from said first, second and third signal, and calculating a second pairwise difference as a difference between a second pair of two signals selected from said first, second and third signal, the second pair being different from the first pair, one of the first, second and third signal being used both in the first pair and the second pair; c) calculating a ratio of the first difference and the second difference; d) storing the one or more known relative position and the one or more calculated ratio in a non-volatile memory of the position sensor.

Preferably steps a) to c) are performed a plurality of times, for example, in case of an angular position sensor, over one period, for example in steps of 5°, or in steps of 4°, or in steps of 3°, or in steps of 2°, or in steps of 1°, or in steps of 0.5°.

In an embodiment, the magnetic field has only two poles.

According to a fifth aspect, the present invention also provides a method of auto-calibrating a sensor arrangement according to the first aspect but having at least four sensors, the method comprising the steps of: a) measuring at least four values of the magnetic field using the at least four magnetic sensors; b) calculating a third pairwise difference between the values obtained from the inner sensors, and calculating a fourth pairwise difference between the values obtained from the outer sensors; c) calculating a second ratio of the third and the fourth second difference; d) determining a phase offset value based on the second ratio.

In an embodiment, the method further comprises storing this phase offset value, or one or more values derived therefrom, in a non-volatile memory.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 3(f) shows another set of two pairwise difference signals as can be derived from the signals of FIG. 3(b). In this example, the sensor signal of an outer sensor is used in both difference signals.

FIG. 3(g) shows how the (uncorrected) arctangent function of the ratio of the difference signals of FIG. 3(f) would look like.

Figure 1A:
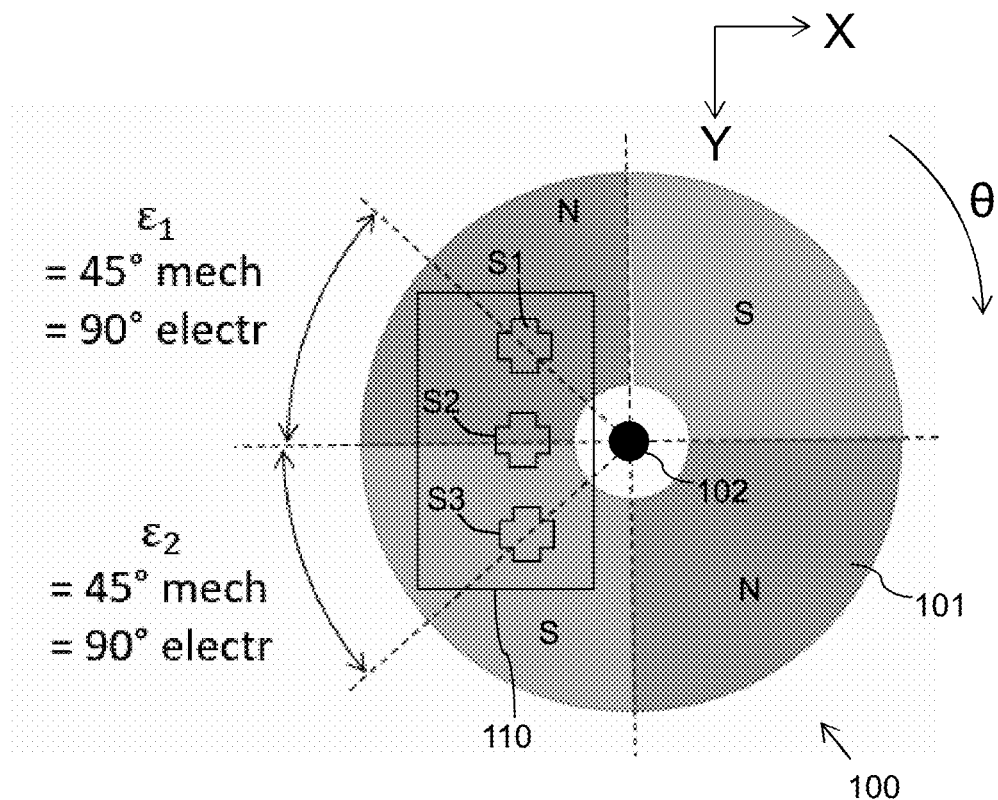
FIG. 1(a) shows an exemplary magnetic sensor arrangement according to an embodiment of the present invention. The magnetic sensor arrangement comprises a four pole ring magnet and a sensor device comprising three magnetic sensors substantially arranged on a straight line. The three sensor signals are substantially 90° phase shifted signals (electrically).

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The term "magnetic sensor" as used herein may refer to one or more sensor elements capable of measuring one or more magnetic effects, such as the Hall effect, or magnetoresistive (MR) effects. Non-limiting examples for magnetoresistive effects include GMR (giant magnetoresistance), CMR (colossal magnetoresistance), AMR (anisotropic magnetoresistance) or TMR (tunneling magneto-resistance). Depending on the context, the term "magnetic sensor" may refer to a single magnetic sensitive element (e.g. a Horizontal Hall element or a Vertical Hall element), or to a group of magnetic elements (e.g. arranged in a Wheatstone bridge, or to a group of at least two Hall sensor elements connected in parallel), or to a sub-circuit further comprising one or more of: a biasing circuit, a readout circuit, an amplifier, an Analog-to-Digital converter, etc.

Figure 5A:
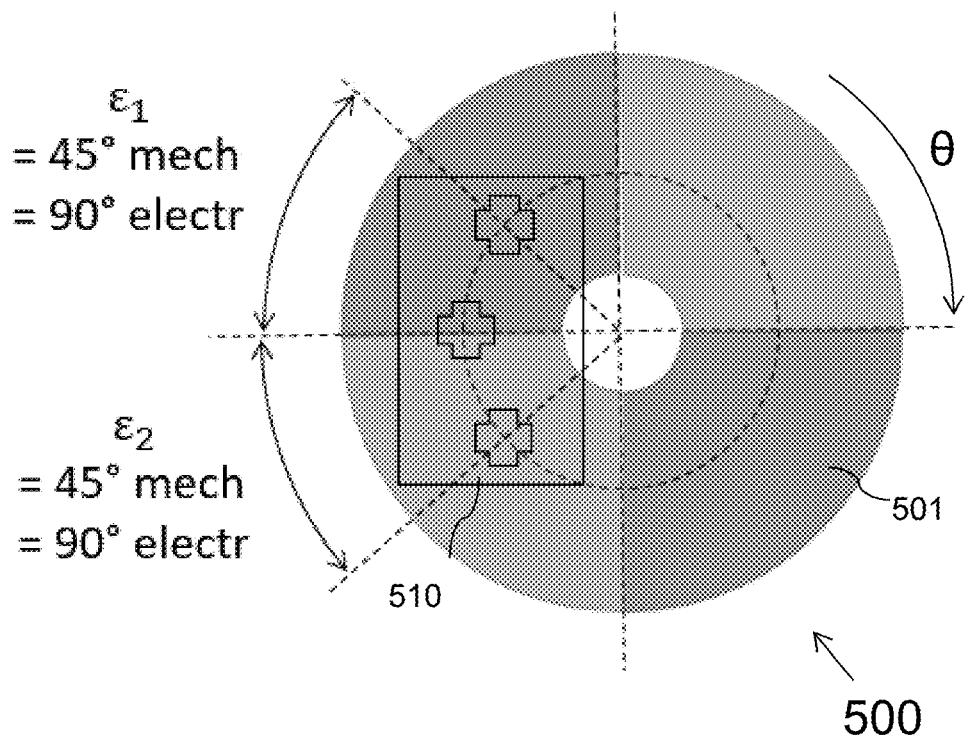
FIG. 5(a) shows an exemplary magnetic sensor arrangement according to another embodiment of the present invention, which can be seen as a variant of the sensor arrangement shown in FIG. 1(a), where the three sensor signals are substantially 90° phase shifted signals (electrically), but where the sensors are located at the corners of an imaginary triangle rather than on a straight line.
Figure 5B:
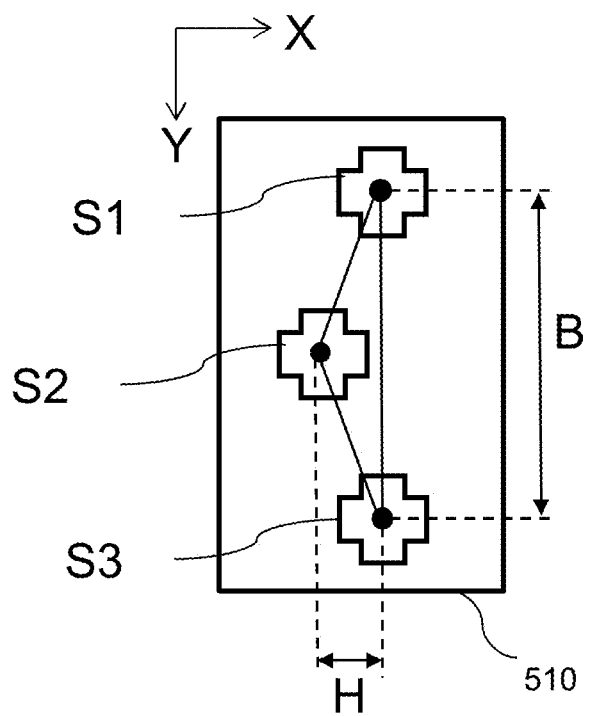
FIG. 5(b) shows that three sensors located at the corners of an imaginary triangle. The triangle of FIG. 5(b) has a height over base ratio (R=H/B) of about 19%.
Figure 6A:
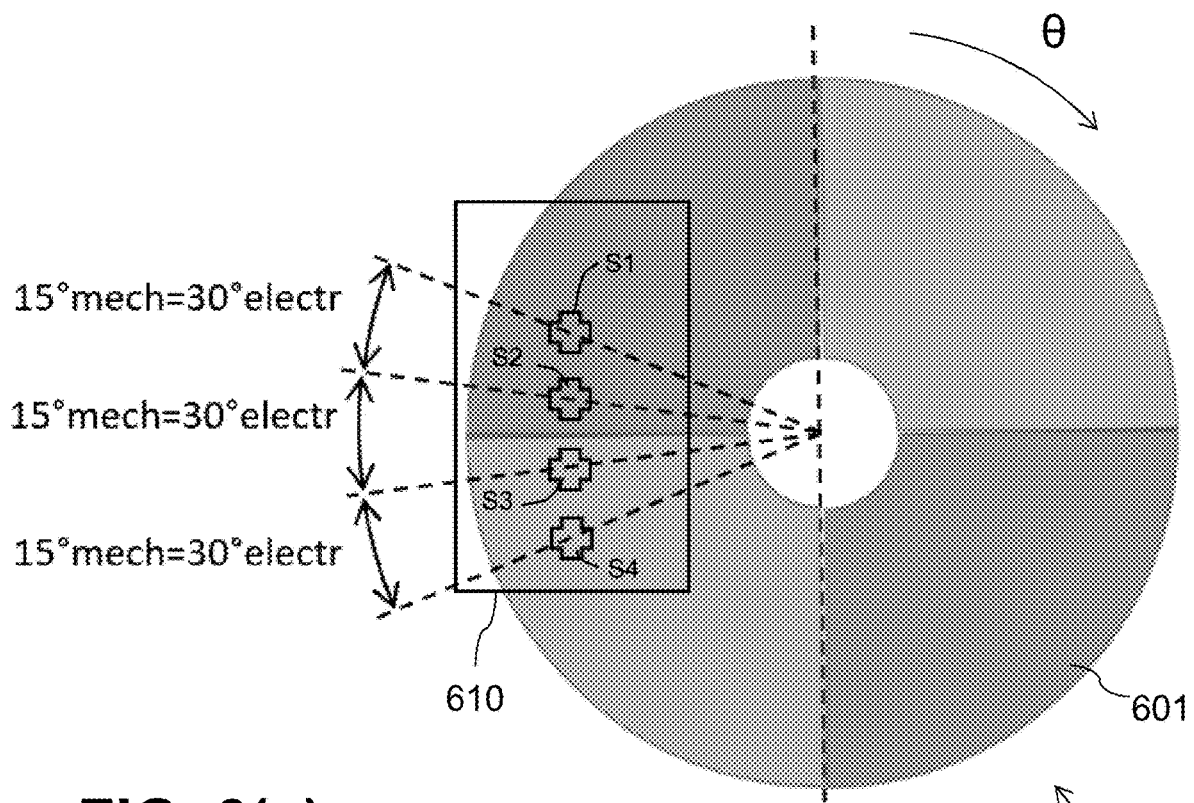
FIG. 6(a) shows an exemplary magnetic sensor arrangement according to another embodiment of the present invention, which can be seen as a variant of the sensor arrangement shown in FIG. 4, the sensor device comprising four magnetic sensors providing four sensor signals which are substantially 30° phase shifted (electrically), the four sensors being located substantially on a straight line.
Figure 6B:
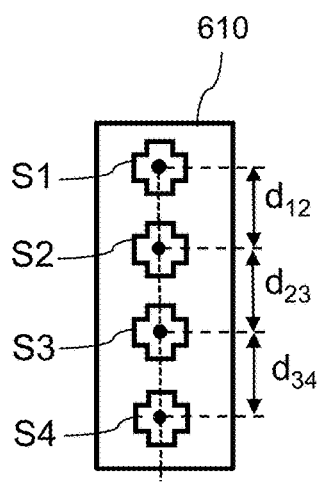
FIG. 6(b) shows the sensor device of FIG. 6(a), showing respective distances between the respective sensors.
Figure 6C:
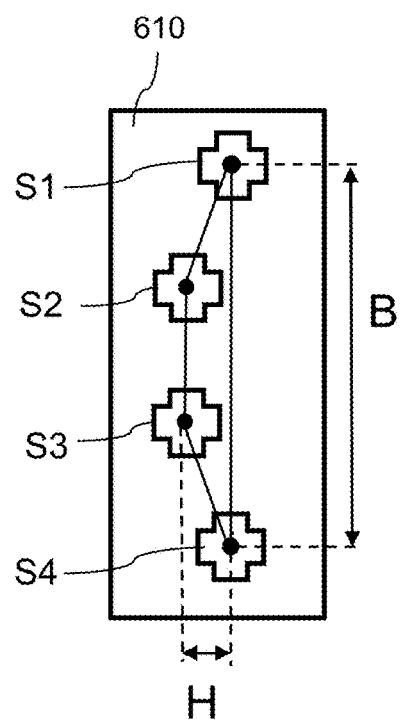
FIG. 6(c) shows a variant of the sensor device of FIG. 6(b), where the four sensors are located at the corners of an imaginary trapezoidal shape. The trapezoidal shape of FIG. 6(c) has a height over base ratio (R=H/B) of about 12%.

As used herein, the statement that "the second sensor is located substantially between the first sensor S1 and the third sensor S3", for example when referring to sensor S2 of FIG. 1(a), or sensor S2 of FIG. 5(b), or sensor S2 of FIG. 6(b), or sensor S2 of FIG. 6(c), means that the sensor S2 is located between a first imaginary plane running through the centre of the first sensor S1, and a second imaginary plane running through the centre of the third sensor S3, and both the first and second imaginary plane being perpendicular to an imaginary line running through the centre of sensor S1 and the centre of sensor S3. In case the three sensors are collinear, the second sensor S2 may be located exactly in the middle between the first sensor S1 and the third sensor S3, but that is not absolutely required, and the invention will also work if the sensor S2 is located closer to the first or to the third sensor. In case the three sensors are not collinear, but for example located on an imaginary circle segment, the second sensor S2 may be located substantially halfway between the first and third sensor as seen from the imaginary centre of said imaginary circle, but that is not absolutely required, and the second sensor may be located closer to the first or closer to the third sensor.

The present invention relates to magnetic position sensors and magnetic position sensor arrangements, e.g. linear position sensors or angular position sensors, and to methods of determining a position using such a position sensor, and to methods of calibrating such position sensors, and to a method of auto-calibrating particular embodiments of such position sensors.

The present invention provides a position sensor arrangement, comprising a magnetic field source and a position sensor device. The magnetic field source is configured for generating a magnetic field having at least two poles (e.g. a North pole and a South pole), or for generating a magnetic field having at least four poles. The position sensor device is movably arranged relative to the magnetic field source, or vice versa. The position sensor device comprises at least three magnetic sensors including a first sensor and a second sensor and a third sensor, each adapted for measuring a respective value of said magnetic field. The first magnetic sensor has a first axis of maximum sensitivity and is configured for providing a first signal. The second magnetic sensor has a second axis of maximum sensitivity parallel to the first axis, and is configured for providing a second signal. The third magnetic sensor has a third axis of maximum sensitivity parallel to the first axis and is configured for providing a third signal. The first, second and third magnetic sensor are arranged on a straight line, or at the corners of an imaginary triangle having a height over base ratio in the range from 1% to 45%.

The sensor device further comprises a processing unit connected to said first, second and third magnetic sensor for obtaining the first, second and third signal, and is configured for determining a position of the position sensor device relative to the magnetic field source based on a ratio of a first pairwise difference "DIFF1" and a second pairwise difference "DIFF2". The first pairwise difference is a difference of a first pair of exactly two signals (e.g. H1, H2) selected from said first, second and third signal. The second pairwise difference signal is a difference of a second pair of exactly two signals selected from said first, second and third signal. The second pair being different from the first pair. One of the first, second and third signal being used both in the first and in the second difference.

Since the first, second and third sensors have an axis of maximum sensitivity which are parallel, they all measure the same disturbance field (if present), and thus, by subtracting two of these signals, the influence of an external disturbance field can be cancelled.

It is an advantage of this embodiment that the first difference signal is a difference between only two signals (e.g. H1−H2), and the second difference signal is a difference between only two signals (e.g. H2−H3). This is extremely easy to calculate and does not require a multiplication or an amplification in the analog domain (the latter typically being implemented by an operational amplifier, often having an offset error and/or a gain error).

It is an advantage of this embodiment that due to said ratio of the first and second difference signal, the measured value is inherently robust against ageing, e.g. due to demagnetisation or temperature effects, and is highly insensitive to distance variations of the sensor with respect to the magnetic source (e.g. permanent magnet).

The present invention is partly based on the insight that it is not absolutely required to use quadrature signals or a Fourier Transformation to determine a linear or angular position, but it is also possible, and actually surprisingly simple, to uniquely determine a position based on a ratio of two difference signals, even if the signals are not 90° phase shifted, and even if the amplitude of DIFF1 and DIFF2 are not the same.

In fact, the inventors found a mathematical expression based on a ratio of difference signals, which can be used to calculate the linear or angular position even if the sensors are spaced apart over an angle different from 90°, for example an angle smaller than 90°, for example spaced over 80°, or 70°, or 60°, or 50°, or 40°, or 30°, or even 20°, or larger than 90°, for example space over 100°, or 110°, or 120°, or 130°, or 140°, or 150°, or even 160°. This offers several important benefits, for example: (i) by allowing to correct (mathematically) any position offset between the sensor device and the magnetic source, and/or (ii) by allowing a single sensor device (having particular dimensions) to be used in combination with several magnetic sources, for example a two-pole magnet, or a four-pole magnet, or a six-pole magnet, or an eight-pole magnet, moreover of various dimensions (see e.g. FIG. 5(c) to FIG. 5(e)). In some embodiments, for optimal results, accurate relative mounting positioning or a calibration may be required. In some embodiments, however, no end-of-line calibration is required at all, and the sensor device can auto-calibrate during actual use, even if the dimensions of the sensor device are not matched to those of the magnetic source, and even if the signals provided by the individual sensors are not 90° phase shifted.

Referring now to the figures.

FIG. 1(a) shows an exemplary magnetic sensor arrangement 100, comprising a four pole ring magnet 101 which is rotatable about a rotation axis or shaft 102 (schematically represented by a black circle), and a sensor device 110 (schematically represented by a rectangle).

The four pole ring magnet 101 may be axially magnetized (in the Z-direction).

The sensor device 110 comprises three magnetic sensors S1, S2, S3 arranged on an imaginary straight line. In the example of FIG. 1(a), each of these sensors comprises a single horizontal Hall element, each having an axis of maximum sensitivity in the Z-direction, perpendicular to the plane of the drawing. The sensors S1, S2, S3 are preferably embedded in a single semiconductor substrate.

In the embodiment of FIG. 1(a), the dimensions and/or the position of the sensor device 110 are matched to the dimensions of the magnet 101. More in particular, the sensor device 110 is located relative to the magnet 101 in such a way that the signals H1, H2, H3 provided by the sensors S1, S2, S3 are substantially 90° phase shifted signals as a function of the angle θ. Indeed, in the example shown in FIG. 1(a), the sensor S1 is located above a North pole "N", the sensor S3 is located above a South pole "S", and the sensor S2 is located above the transition between said North pole and said South pole.

Figure 1B:
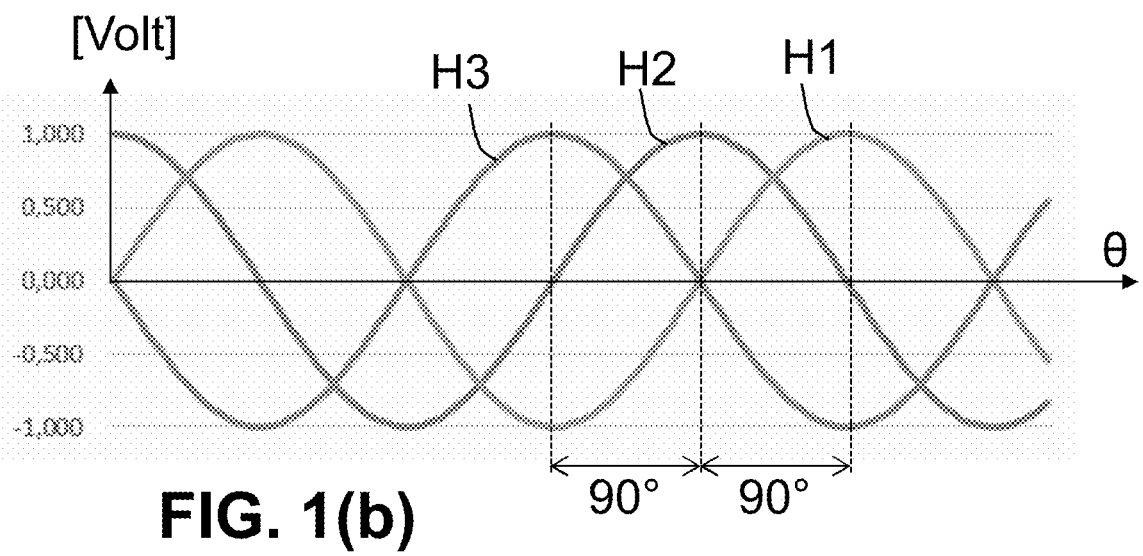
FIG. 1(b) shows three exemplary sensor signals as can be measured by the three magnetic sensors of the sensor device shown in FIG. 1(a).

FIG. 1(b) shows three exemplary sensor signals H1, H2, H3 as can be measured by the three sensors S1, S2, S3 of the sensor device 110 shown in FIG. 1(a). As can be seen, each of these signals is substantially sinusoidal, the three signals have substantially the same amplitude, and the signals are substantially 90° phase shifted. The set of signals H1 and H2 are quadrature signals, and the set of signals H2 and H3 are also quadrature signals, but in practice, the individual signals H1, H2 and H3 are sensitive to a disturbance field (if present). FIG. 1(b) shows the signals as voltages, but that is not absolutely required, and current values can for example also be used.

Figure 1C:
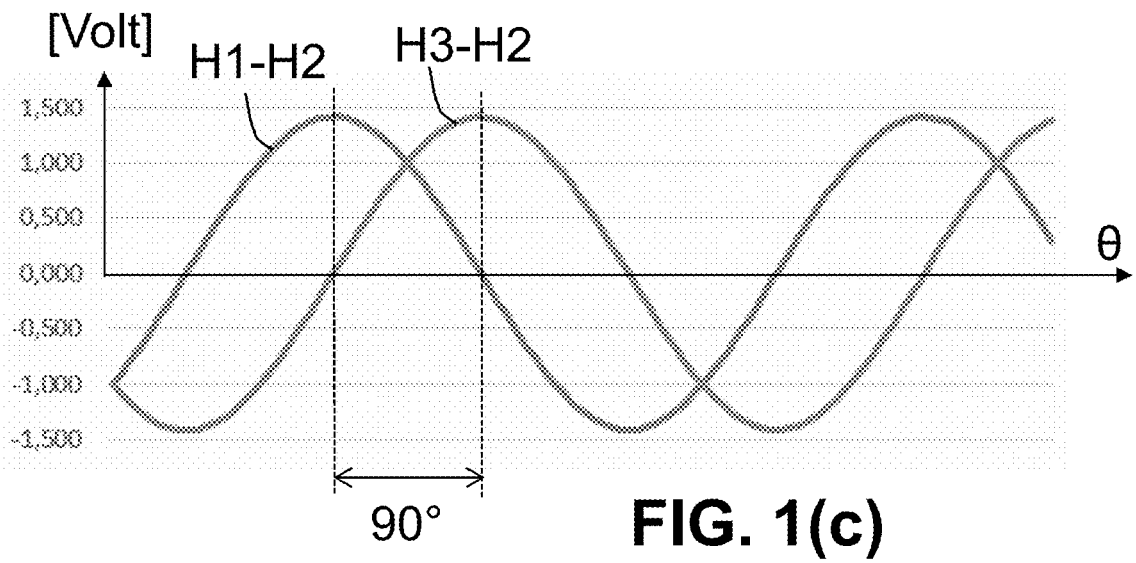
FIG. 1(c) shows two pairwise difference signals derived from the three sensor signals of FIG. 1(b), one sensor signal being used in both difference signals. In this example, the sensor signal of the central sensor is used in both difference signals.

FIG. 1(c) shows two pairwise difference signals, in this example, DIFF1=(H1−H2), and DIFF2=(H3−H2) as a function of the angle θ. Thus the signal H2 is used in both difference signals. Surprisingly, the difference signals DIFF1 and DIFF2 have a same amplitude, and are 90° phase shifted relative to each other, thus are quadrature signals. Importantly, these difference signals are insensitive to an external disturbance field. A pair of values of the difference signals DIFF1, DIFF2 uniquely defines an angular position (within a particular angular range).

Figure 1D:
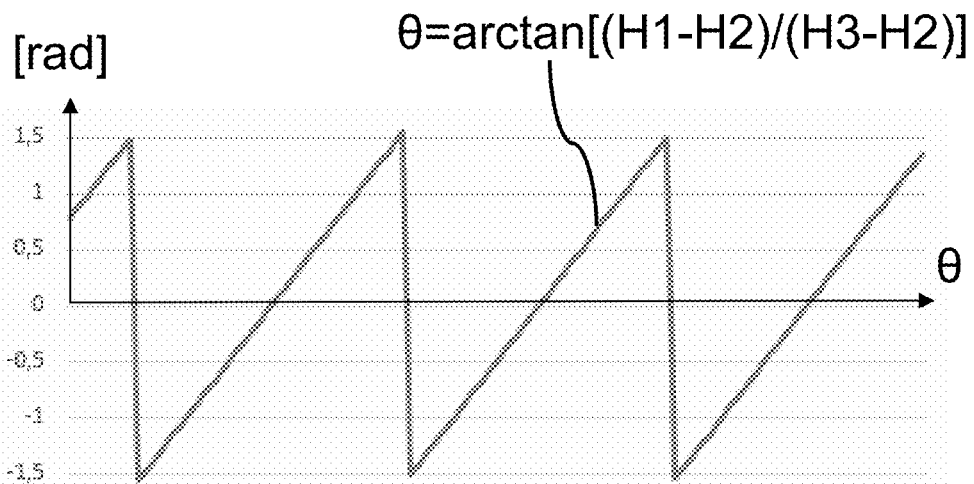
FIG. 1(d) shows an exemplary function plot, and a mathematical formula which can be used to determine an angular position of the sensor device of FIG. 1(a) relative to the magnetic source, based on a ratio of the pairwise difference signals shown in FIG. 1(c).

FIG. 1(d) shows a mathematical formula which can be used to determine the unique angular position, and a corresponding function plot. As shown, the angular position can be calculated as a function of a ratio of the two difference signals DIFF1 and DIFF2, more in particular as an arctan-function of said ratio, for example using the formula:

$$\theta = \arctan[(H1-H2)/(H3-H2)] \qquad [1a]$$

For completeness it is pointed out that $\arctan(-x) = -\arctan(x)$, and that $\arctan(1/x) = -\pi/2 - \arctan(x)$. Whether the angular position is positive or negative is a matter of definition, and so is the sign before the arctan function, and so is the "start position" or "zero position". Hence, the following exemplary formulas will also work:

$$\theta = \theta_0 + \arctan[(H1-H2)/(H3-H2)] \qquad [1b], \text{ or}$$

$$\theta = \theta_0 - \arctan[(H1-H2)/(H3-H2)] \qquad [1b], \text{ or}$$

$$\theta = \theta_0 + \arctan[(H3-H2)/(H1-H2)] \qquad [1c], \text{ or}$$

$$\theta = \theta_0 - \arctan[(H3-H2)/(H1-H2)] \qquad [1d], \text{ etc.}$$

While the sensor device shown in FIG. 1(a) has three so called horizontal Hall plates to measure a Bz field component of the magnetic field created by the magnet, that is not absolutely required, and other magnetic sensors can also be used, for example three vertical Hall plates configured to measure a field in the X-direction (which is a radial field for the second sensor S2), or for example three vertical Hall plates configured to measure a field in the Y-direction (which is a tangential field for the second sensor S2), but other magnetic sensors can also be used, for example GMR or TMR sensors, or other suitable magnetic sensors. It is noted that biasing and readout circuitry for such sensors are well known in the art, and hence need not be explained in detail here. Likewise, readout-techniques such as for example "spinning current techniques" are also well known in the art and can also be used here.

While the sensor arrangement shown in FIG. 1(a) comprises a permanent magnet as the magnetic source, that is not absolutely required, and other magnetic sources can also be used, for example, a structure with an electrical conductor conducting an electrical current.

The permanent magnet shown in FIG. 1(a) is a ring magnet, but the invention will also work for other magnets, for example, a disk magnet.

The permanent magnet shown in FIG. 1(a) has four poles, but the invention will also work for magnets with more than four poles, for example, six poles or eight poles, or more than eight poles.

The permanent magnet shown in FIG. 1(a) may be axially magnetized, but the present invention is not limited thereto, and other magnetization can also be used, for example diametrical magnetization.

Figure 10:
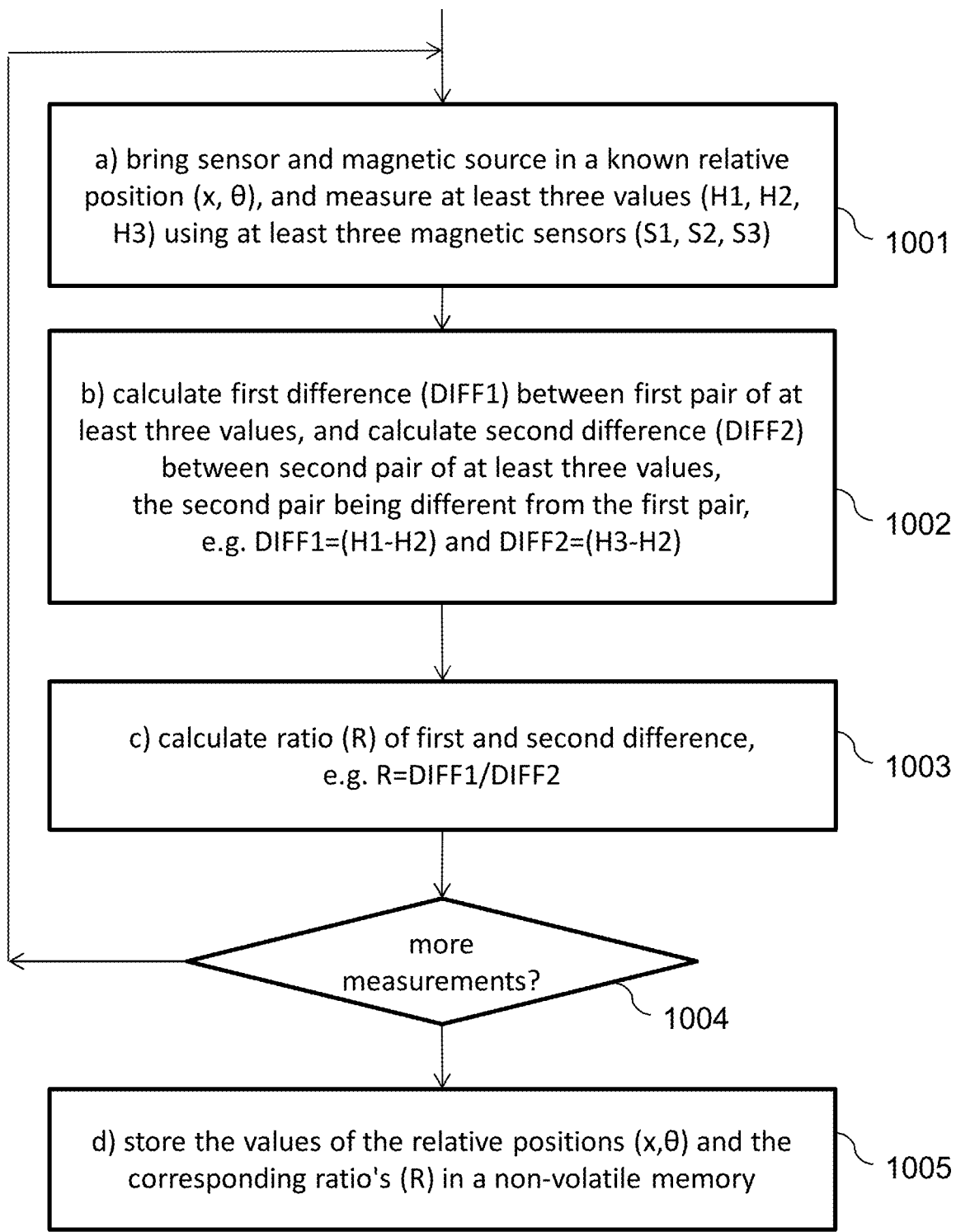
FIG. 10 shows a method of calibrating a sensor arrangement according to an embodiment of the present invention, which may optionally be used in the sensor arrangements of FIGS. 1(a) to FIG. 8(c).

It is noted that instead of calculating the arctan-function, it is also possible to store a look-up table in a non-volatile memory 731 (see FIG. 7) of the sensor device 710. This look-up table can for example store two columns of data: a first column with the ratio-values, and a second column with the corresponding angular position θ. The processing unit 730 (see FIG. 7) may be further adapted for interpolating values of this table. It is noted that such a table can also take into account certain artefacts, such as for example non-homogeneities or non-idealities, e.g. related to the amplitude of the second sensor S2 not being exactly the same as that of the first and third sensor S1, S3. FIG. 10 shows a flow-chart of a method 1000 which can be used to build such a look-up table.

While the three sensors are preferably integrated on a single substrate, preferably along with the processing unit 730, that is not absolutely required, and multiple substrates can also be used.

In FIG. 1(a) to FIG. 1(d) the first difference signal DIFF1 was chosen as H1−H2, and the second difference signal DIFF2 was chosen as H3−H2, and the ratio was chosen as DIFF1/DIFF2, but other combinations are also possible, for example as listed here:

In an embodiment, DIFF1=±(H1−H2), and DIFF2=±(H3−H2), and R=DIFF1/DIFF2.

In an embodiment, DIFF1=±(H2−H3), and DIFF2=±(H1−H2), and R=DIFF1/DIFF2.

Figure 8A:
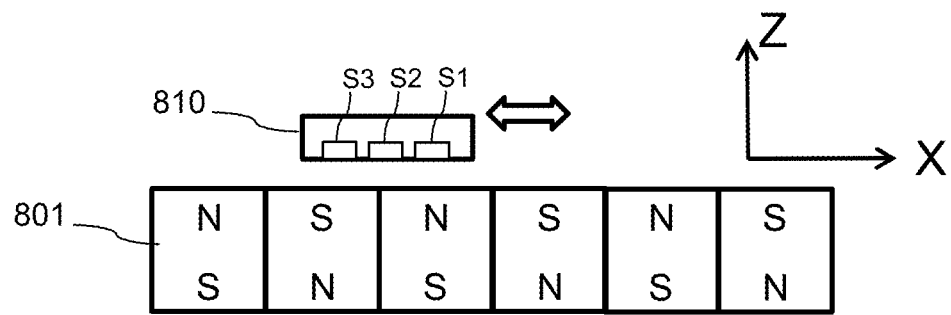
FIG. 8(a) shows an exemplary embodiment of a linear sensor arrangement according to embodiments of the present invention, comprising a sensor device having three magnetic sensors configured for measuring three signals which are 90° phase shifted.

While the embodiment of FIG. 1(a) to FIG. 1(d) is explained for an angular position sensor, the same principles also apply for a linear sensor, see e.g. FIG. 8(a).

While being an elegant solution, the embodiment of FIGS. 1(a) to 1(d) has as a disadvantage that, in order to obtain accurate results, the locations of the sensors S1, S2, S3 need to be aligned with the position of the poles of the magnetic source, which poses restrictions on the dimensions and/or on the mounting position of the sensor device 110 and/or the magnetic source 101. The inventors wanted to make a solution which is more versatile, without losing the advantages of this solution (e.g. strayfield immune, highly insensitive to ageing, highly insensitive to demagnetization).

Figure 2A:
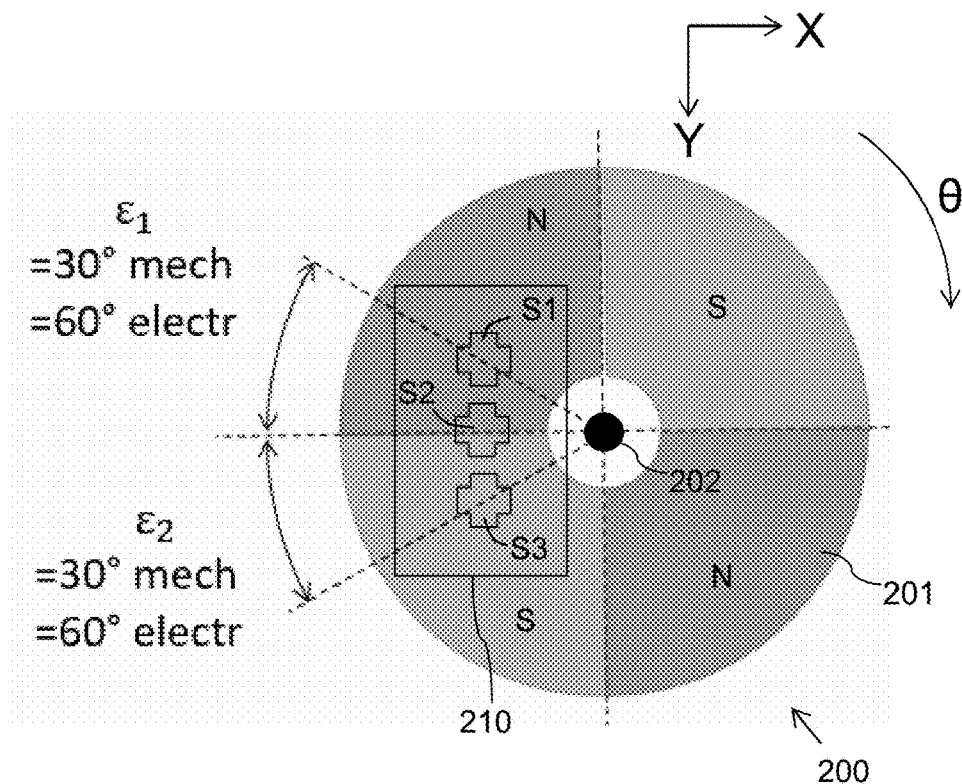
FIG. 2(a) shows an exemplary magnetic sensor arrangement according to another embodiment of the present invention, which can be seen as a variant of the sensor arrangement shown in FIG. 1(a). The magnetic sensor arrangement comprises a four pole ring magnet and a sensor device comprising three magnetic sensors substantially arranged on a straight line. The three sensor signals are substantially 60° phase shifted signals (electrically).

FIG. 2(a) shows an exemplary magnetic sensor arrangement 200, which can be seen as a variant of the sensor arrangement 100 shown in FIG. 1(a). The main difference between this sensor arrangement and that of FIGS. 1(a) to 1(d) is that the three sensors S1, S2, S3 are arranged relative to the magnet poles such that the three sensor signals H1, H2, H3 are substantially 60° phase shifted signals (electrically) instead of 90°. This offers (inter alia) the advantage that the substrate 210 can be smaller than the substrate 110 of FIGS. 1(a) to 1(d), hence more compact and typically also more cost effective, which is an extremely important advantage in e.g. the automotive market.

Figure 2B:
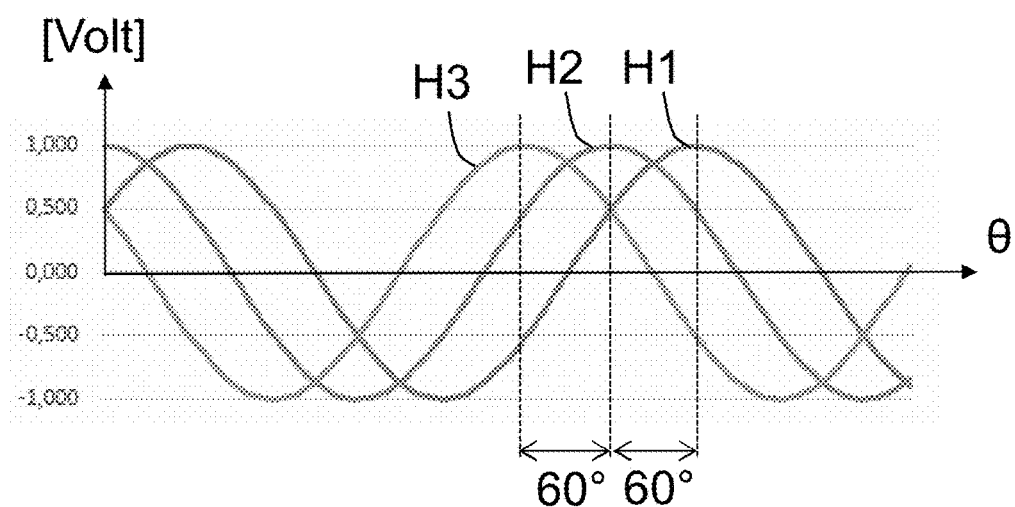
FIG. 2(b) shows three exemplary sensor signals as can be measured by the three magnetic sensors of the sensor device shown in FIG. 2(a).

FIG. 2(b) shows three exemplary sensor signals H1, H2, H3 as can be measured respectively by the three sensors S1, S2, S3 of the sensor device 210 shown in FIG. 2(a).

Figure 2C:
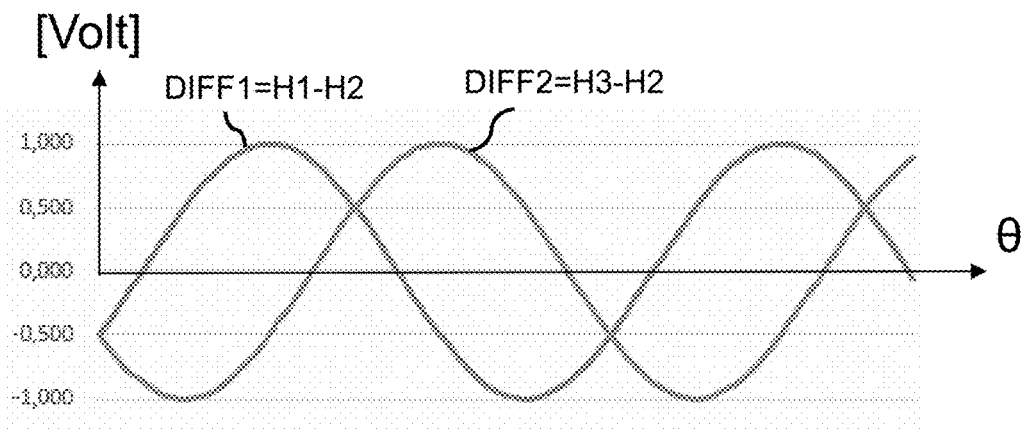
FIG. 2(c) shows two pairwise difference signals derived from the three sensor signals of FIG. 2(b), one sensor signal being used in both difference signals. In this example, the sensor signal of the central sensor is used in both difference signals.

FIG. 2(c) shows two pairwise difference signals as can be derived from the signals of FIG. 2(b), in the example DIFF1=H1−H2 and DIFF2=H3−H2. Thus, signal H2 is used in both difference signals DIFF1, DIFF2. It can be seen that the amplitude of the two difference signals DIFF1, DIFF2 is substantially the same, but in contrast to the signals of FIG. 1(c), the signals DIFF1, DIFF2 are not quadrature signals, hence cannot simply be used in an arc-tangent function. The inventors of the present invention however surprisingly found that these difference signals nevertheless uniquely identify an angular position (within the measurement range).

Figure 2D:
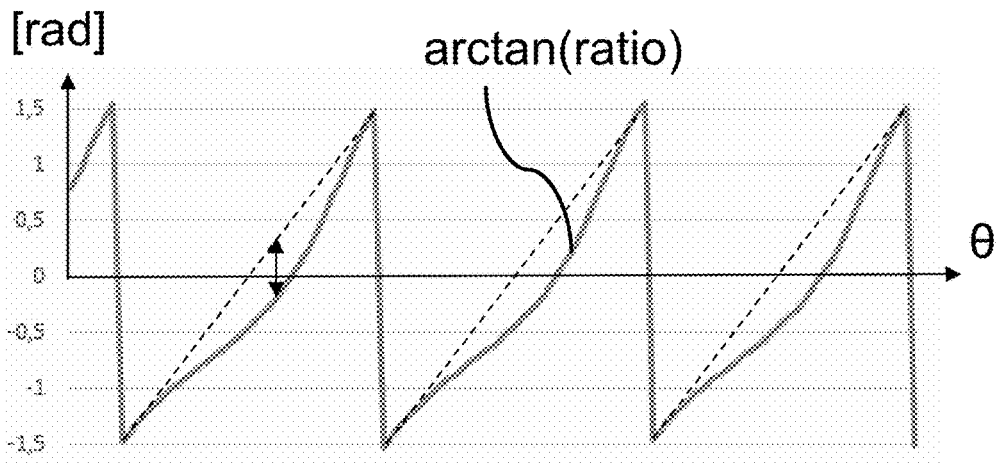
FIG. 2(d) shows an exemplary function plot, and a mathematical formula ("referred to herein as "uncorrected formula") which may be used to determine an angular position of the sensor device of FIG. 2(a) relative to the magnetic source, based on a ratio of the pairwise difference signals shown in FIG. 2(c).

FIG. 2(d) shows how the arctangent-function of the ratio of the difference signals would look like. As can be seen, there is a large error between the value provided by this arctan function and the actual angular position (up to about 0.5 rad or about 30°). But the inventors realised that it is perfectly possible to build a look-up table having two columns, a first column containing values of the ratio of the difference signals, and a second column containing values of the correct angular position θ (as illustrated in dotted line).

It is simply amazing that such a simple solution, (measuring three signals, calculating two differences, calculating a ratio of the differences, and using the ratio as an index of a look-up table), can provide an accurate position value, in a manner which is insensitive to ageing, demagnetization, and an external disturbance field, especially taking into account that the signals are not quadrature signals.

Figure 2E:
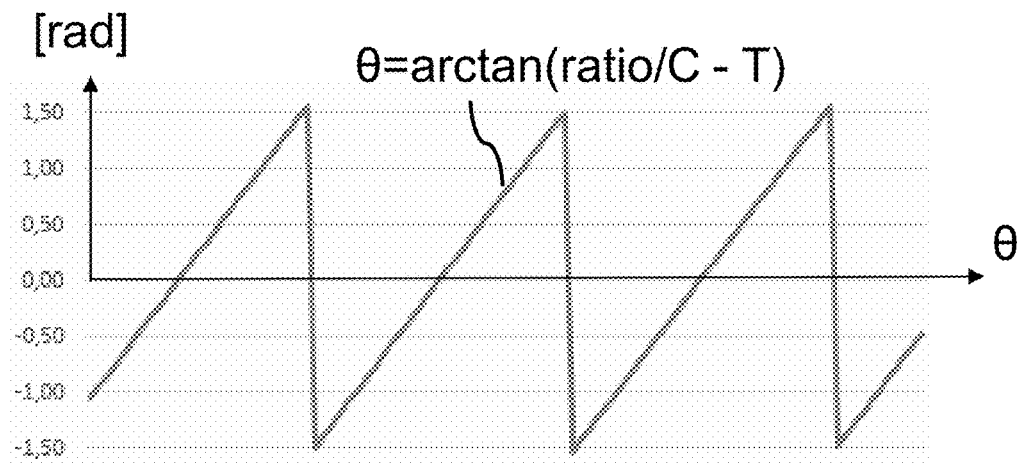
FIG. 2(e) shows an exemplary function plot, and a mathematical formula ("referred to herein as "corrected formula") which may be used to determine an angular position of the sensor device of FIG. 2(a) relative to the magnetic source, based on a ratio of the pairwise difference signals shown in FIG. 2(c), where C is different from 1, and/or T is different from 0.

FIG. 2(e) shows that the dotted lines of FIG. 2(d) can also be calculated using a mathematical formula, referred to herein as "corrected formula", which coincides with the dotted lines of FIG. 2(d) and thus also provides the accurate position values. In this way the look-up table can be avoided.

The mathematical function can be written as:

$$\theta = \arctan(\text{ratio}/C - T) \quad [2]$$

$$\text{where ratio} = DIFF1/DIFF2 \quad [3],$$

and DIFF1=H1−H2, and DIFF2=H3−H2, and C and T are constants.

It can be seen that formula [2] is equal to the uncorrected arctan function if C=1 and T=0.

It was found that if the three signals H1, H2, H3 are phase shifted over 60°, the value of) C=cos(30°)≈0.866, and the value of T=tan(30°)≈0.577, or in general, if the three signals are phase shifted over an angle α, then $$C = \cos(90° - \alpha) \quad [4], \text{ and}$$

$$T = \tan(90° - \alpha) \quad [5]$$

In preferred embodiments, the value of C is different from 1.0 (e.g. smaller than 0.95), and/or the value of T is different from 0.0 (e.g. having an absolute value of at least 0.05).

In an embodiment, C is smaller than 0.95 and T is larger than 0.05.

In an embodiment, C is smaller than 0.95 and T is smaller than −0.05.

Several variants are possible, for example:

In an embodiment, DIFF1=±(H1−H2), and DIFF2=±(H3−H2), and R=DIFF1/DIFF2.

In an embodiment, DIFF1=±(H2−H3), and DIFF2=±(H1−H2), and R=DIFF1/DIFF2.

And for each of these embodiments, the formula $$\theta = \pm \arctan(\text{ratio}/C \pm T) \quad [6a]$$

with appropriate signs, depending on which difference signals are used, is applicable.

It is an advantage of this embodiment that (for a given magnet) the sensor device 210 can be made smaller (thus cheaper) than the sensor device 110, without losing the advantages described above (e.g. insensitive for strayfield, ageing, demagnetization).

As mentioned above, arctan(−x)=−arctan(x), and arctan(1/x)=−pi/2−arctan(x), and the positive direction or negative direction are a matter of definition, and so is the "start position" or "zero position". Hence, the following exemplary formulas will also work:

$$\theta=\theta_0+\arctan(\text{ratio}/C\pm T) \quad [6b], \text{ or}$$

$$\theta=\theta_0-\arctan(\text{ratio}/C\pm T) \quad [6b], \text{ or}$$

$$\theta=\theta_0+\arctan[C/(\text{ratio}\pm T\times C)] \quad [6c], \text{ or}$$

$$\theta=\theta_0-\arctan[C/(\text{ratio}\pm T\times C)] \quad [6d], \text{ etc.}$$

Figure 3A:
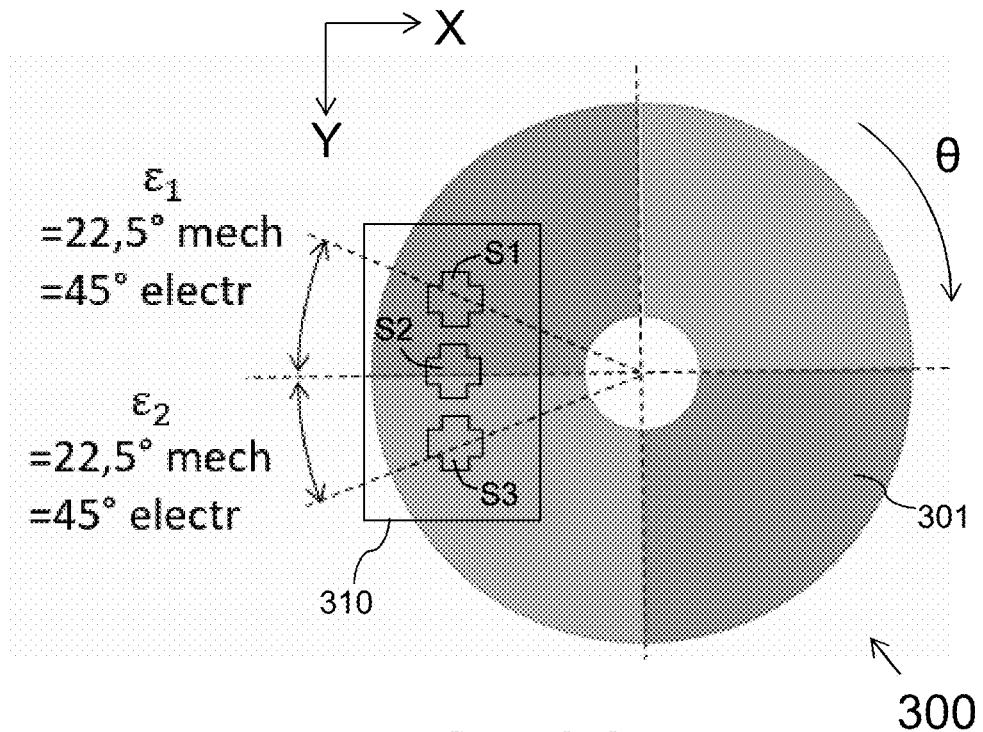
FIG. 3(a) shows an exemplary magnetic sensor arrangement according to another embodiment of the present invention, which can be seen as a variant of the sensor arrangement shown in FIG. 2(a), where the three sensor signals are substantially 45° phase shifted signals (electrically).

FIG. 3(a) shows an exemplary magnetic sensor arrangement 300, which can be seen as a variant of the sensor arrangement 200 shown in FIG. 2(a), the main differences being that the three sensors S1, S2, S3 are located closer together, and that the three sensor signals H1, H2, H3 are substantially 45° phase shifted signals (electrically) rather than 60°. Everything else described above, is also applicable here, mutatis mutandis.

Figure 3B:
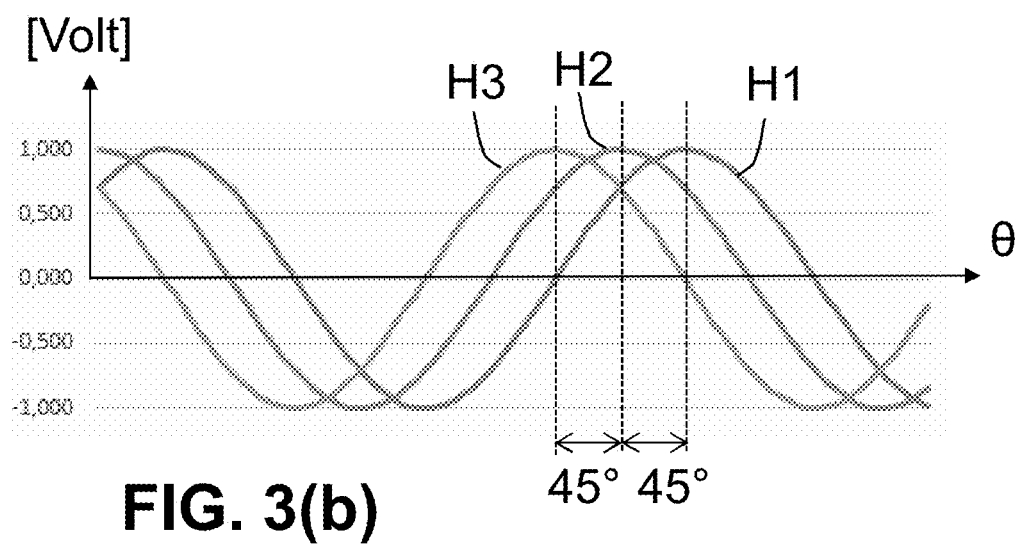
FIG. 3(b) shows three exemplary sensor signals as can be measured by the three sensors of the sensor device shown in FIG. 3(a).

FIG. 3(b) shows three exemplary sensor signals H1, H2, H3 as can be measured by the three sensors S1, S2, S3 of the sensor device 310 shown in FIG. 3(a), as a function of the angle θ.

Figure 3C:
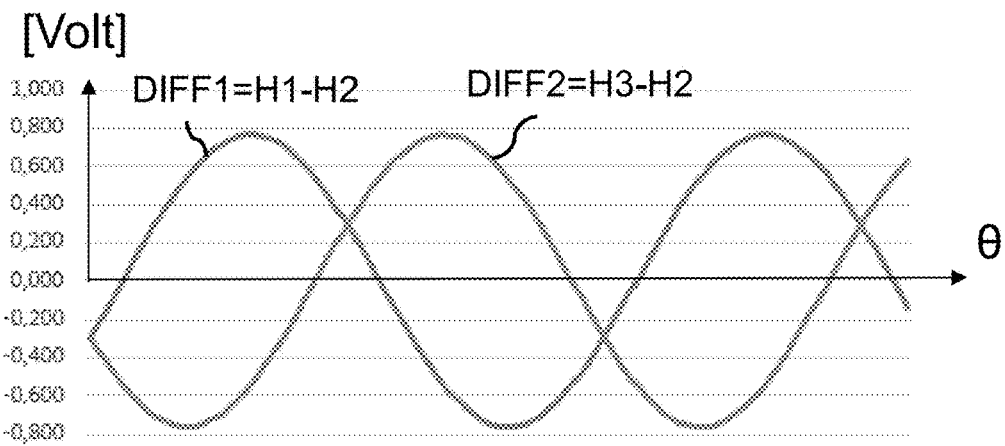
FIG. 3(c) shows two pairwise difference signals derived from the three sensor signals of FIG. 3(b), one sensor signal being used in both difference signals. In this example, the sensor signal of the central sensor is used in both difference signals.

FIG. 3(c) shows two pairwise difference signals DIFF1, DIFF2 as can be derived from the signals of FIG. 3(b).

Figure 3D:
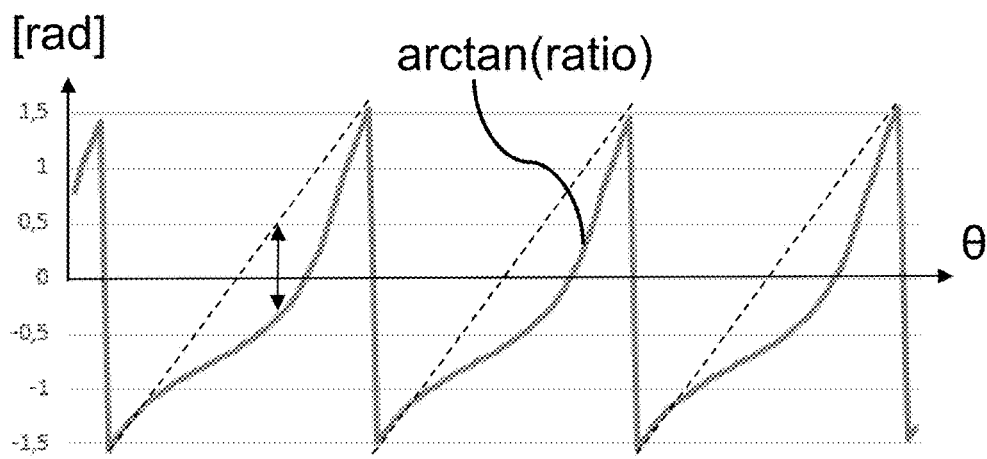
FIG. 3(d) shows an exemplary function plot, and a mathematical formula ("referred to herein as "uncorrected formula") which may be used to determine a position of the sensor device of FIG. 3(a) relative to the magnetic source, based on a ratio of the pairwise difference signals shown in FIG. 3(c).

FIG. 3(d) shows how the uncorrected arctangent-function of the ratio of the difference signals would look like. The (worst case) error is even larger than in FIG. 2(d), but as stated above, it is perfectly possible to build a look-up table which converts the ratio-values into the correct angular position values (as indicated by the dotted lines).

Figure 3E:
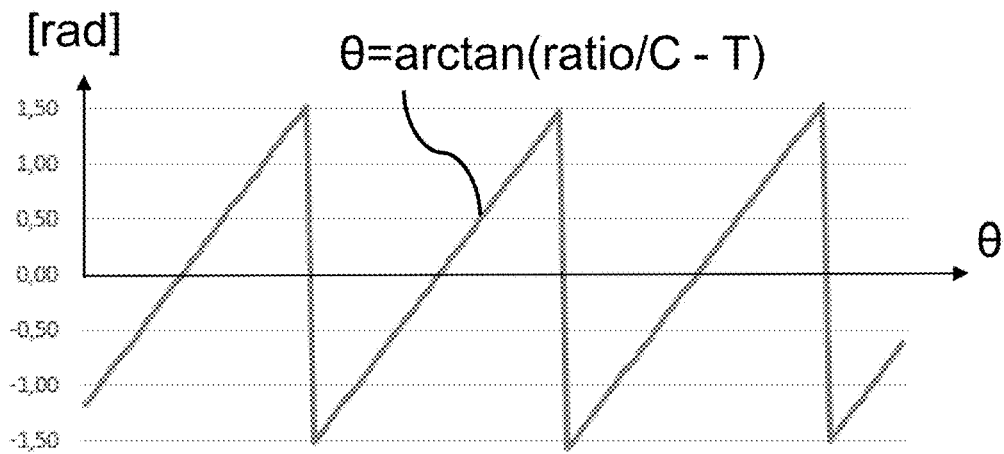
FIG. 3(e) shows an exemplary function plot, and a mathematical formula ("referred to herein as "corrected formula") which may be used to determine a position of the sensor device of FIG. 3(a) relative to the magnetic source, based on a ratio of the pairwise difference signals shown in FIG. 3(c), where C is different from 1, and/or T is different from 0.

FIG. 3(e) shows that the mathematical formula already mentioned above can also be used here to calculate the angular position without requiring said look-up table. In this example, the value of C=cos(90°−45°)=cos(45°)≈0.707, and the value of T=tan(45°)≈1.000.

In the example of FIG. 3(a), the phase shift ε2 between H2 and H3 is equal to the phase shift ε1 between H1 and H2, but the invention is not limited thereto, and the phase shift may also be different. It can be understood from the above, that a look-up table can also be used to calculate the angular position, based on the ratio of the two difference signals.

It is an advantage of the embodiment of FIG. 3(a) that the sensor device 310 can be made even smaller than the sensor device 210 of FIG. 2(a), for the same magnet, without losing the advantages described above.

From the examples shown in FIG. 2(a) to FIG. 2(d) and FIG. 3(a) to FIG. 3(d) it can be understood that the same principles are also applicable for other phase shift values, for example any phase shift value in the range from about 5° to 85°, or from 10° to 85°, or from 20° to 85°, or from 10° to 80°, or from 20° to 80°.

This insight allows to first (i) assemble the sensor device and the magnetic source, and to then (ii) determine the values of C and T, or build and store the look-up table (e.g. using the method of FIG. 10), thereby automatically taking into account any size mismatch of the sensor device and the magnet, and/or any mounting deviations (w.r.t. the envisioned position), and/or non-idealities of the magnetization of the magnet. In other words, the solution offered is highly versatile and highly accurate. If the non-volatile memory can be fully or partially rewritten (as is the case for example with EEPROM or flash), it is even possible to recalibrate the sensor arrangement in the field during maintenance, for example by overwriting the value of C and T, or by overwriting the look-up table.

In particular embodiments, the sensor device may store a plurality of look-up tables in a non-volatile memory (e.g. in ROM), for example a first table for ε1=ε2=α=90° (as in FIGS. 1(a) to 1(d)) and a second table for α=60° (as in FIGS. 2(a) to 2(d)), and a third table for α=45° (as in FIGS. 3(a) to 3(d)), in compressed or uncompressed form, or delta-coded, or in another suitable way. And which table to choose may be selected by means of an input signal (e.g. a pin being pulled high or low via a resistor), or via a digital interface providing the table number (in the example: 1 or 2 or 3).

In a further embodiment, the sensor device may even apply a two-dimensional interpolation using two tables. For example, it would be possible to provide a value for the position θ based on two parameters, a first parameter being the ratio R=DIFF1/DIFF2 (to search in the tables), and the second parameter being for example the value of α (to interpolate between several tables). The ratio can be calculated by the device itself, based on the measured magnetic signals H1, H2, H3. The value of α, or ε1 and ε2, can be provided via input-pins, or via a serial interface, or may be stored in a non-volatile memory, e.g. after a calibration test. Of course, this is only an example, and the skilled person having the benefit of the present disclosure can find many variants within the scope of the present invention as defined by the claims. For example, in one such variant, the values of the ratio R and corresponding positions θ are coded in the form of piece-wise-linear approximations.

Figure 3F:
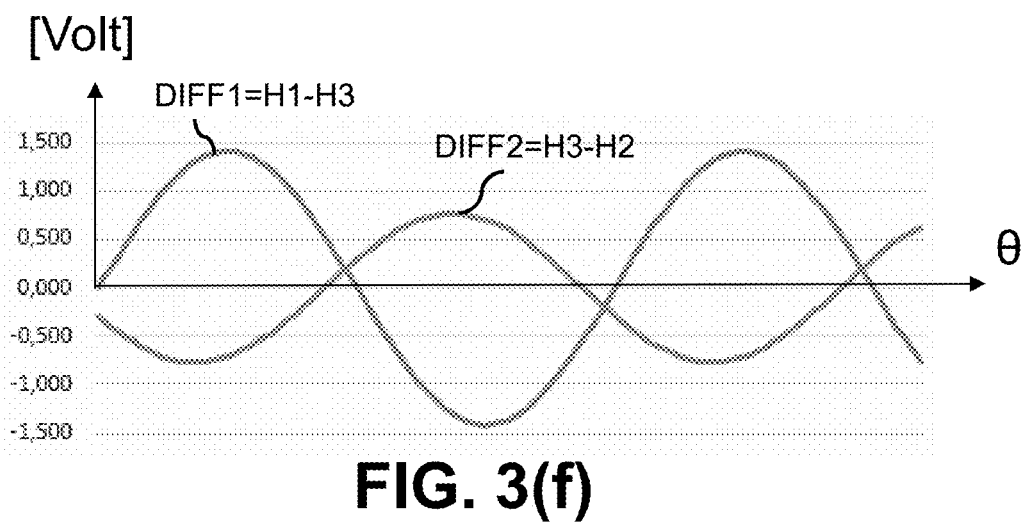
FIG. 3(f) and FIG. 3(g) illustrate another embodiment, using another set of difference signals.

FIG. 3(f) shows another set of two pairwise difference signals as can be derived from the signals of FIG. 3(b), namely DIFF1=H1−H3, and DIFF2=H3−H2. In this example, H3 provided by an outer sensor is used in both difference signals. As can be seen, the amplitude of these difference signals is not the same, but also in this case, the ratio R=DIFF1/DIFF2 uniquely defines one angular position, which can be determined using a look-up table.

Figure 3G:
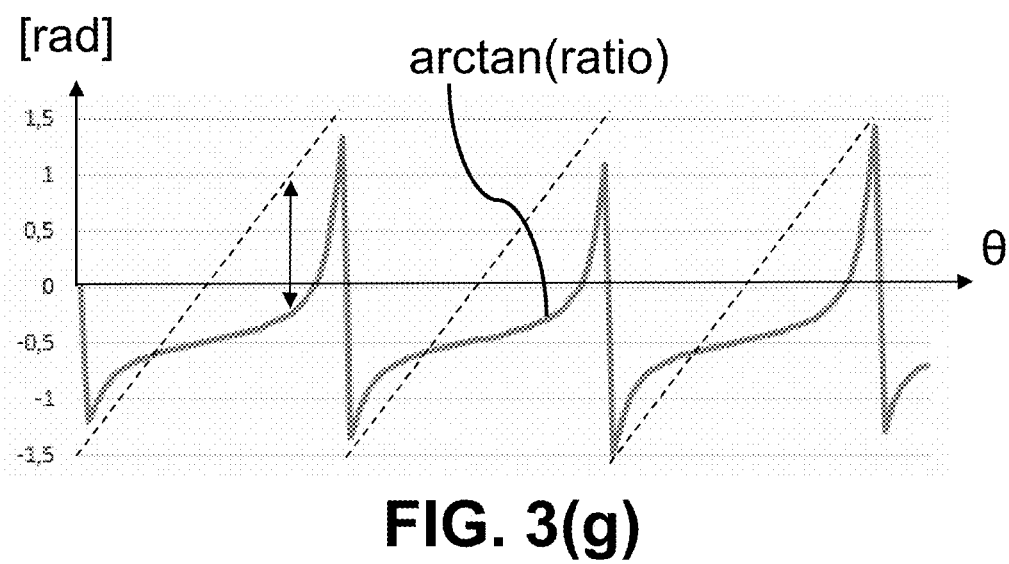

FIG. 3(g) shows how the arctangent-function of the ratio R=DIFF1/DIFF2 of these difference signals shown in FIG. 3(f) would look like. While these plots are typically not used per se, they illustrate that it is possible (using a look-up-table) to convert the ratio of the difference signals of FIG. 3(f), to uniquely determine an angular position (within the measurable range). The drawing of FIG. 3(f) is shown for the example of the signals H1, H2, H3 of FIG. 3(a) being phase shifted by 45°, but it shall be clear that the same reasoning also holds for other phase offsets.

Figure 4:
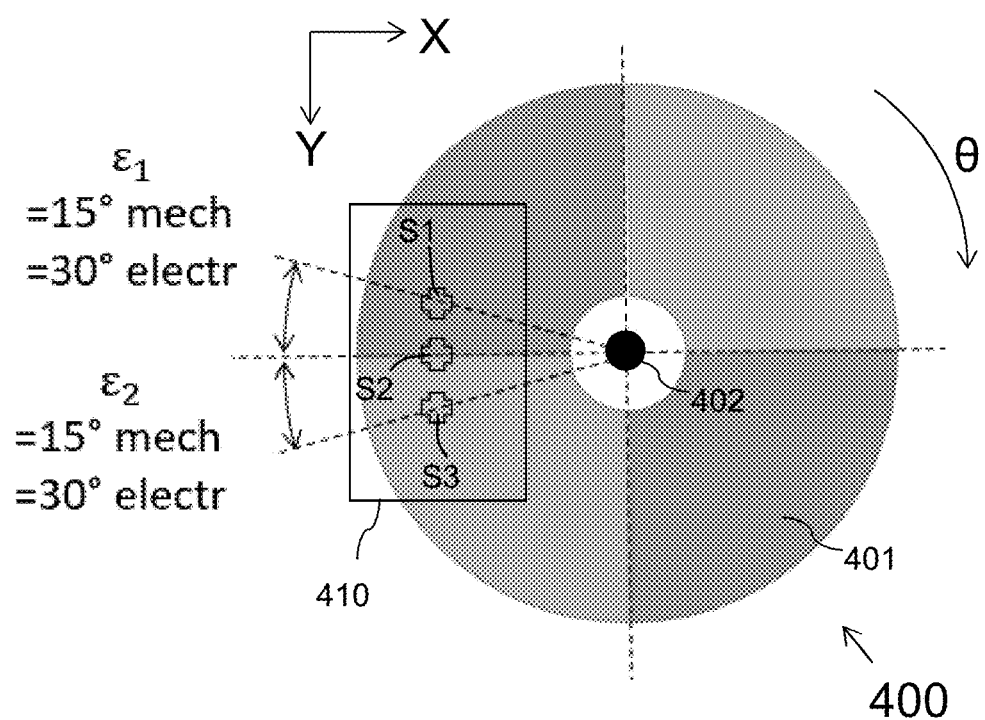
FIG. 4 shows an exemplary magnetic sensor arrangement according to another embodiment of the present invention, which can be seen as a variant of the sensor arrangement shown in FIG. 2(a), where the three sensor signals are substantially 30° phase shifted signals (electrically).

FIG. 4 shows an exemplary magnetic sensor arrangement 400, which can be seen as a variant of the sensor arrangement 200 shown in FIG. 2(a), or as a variant of the sensor arrangement 300 shown in FIG. 3(a). The main difference being that the sensors S1, S2, S3 are located even closer together, such that the three sensor signals H1, H2, H3 are substantially 30° phase shifted signals (electrically).

The main purpose of this drawing is to illustrate that, for a given magnetic source 401 and a given position (e.g. radial position) of the sensor device relative to the shaft 402, the size of the substrate 410 can be further reduced by decreasing the distance between the sensors, or in other words, by decreasing the angles ε1 and ε2. From the above, it can be understood that the effect of such shrinkage will be that the sensor signals H1, H2 and H3 will be signals with a decreased phase offset, in the example 30° electrical, but even for such a small phase shift, the position θ of the sensor device 410 relative to the magnetic source 410 can be uniquely defined (within the measurement range) based on a ratio of two pairwise difference signals, for example by means of a mathematical expression, or by means of a look-up table (optionally with one-dimensional interpolation), or by means of multiple look-up tables (optionally with two-dimensional interpolation).

While not explicitly shown, the angles ε1, ε2 can be further decreased to for example an angle of 20° electrical, or even as low as 15° electrical, or even 10° electrical. It can be understood however that for such a small offset, the effect of temperature noise and/or truncation errors or quantisation errors (due to digitisation) or the like may start to become more pronounced.

FIG. 5(a) shows an exemplary magnetic sensor arrangement 500, which can be seen as a variant of the sensor arrangement shown in FIG. 1(a), where the three sensor signals H1, H2, H3 are substantially 90° phase shifted signals (electrically), but where the sensors S1, S2, S3 are located at the corners of an imaginary triangle, rather than on a straight line.

In the example of FIG. 5(a) the three sensors are located on a circle having a center located on the rotation axis of the magnet, but that is not absolutely required for the invention to work.

In variants of the sensor system of FIG. 5(a) the three sensors S1, S2, S3 are also located on an imaginary triangle, which form a circle segment, but the center of which is not located on the rotation axis of the magnet, but is offset from said axis, e.g. by at least 3 mm, or at least 4 mm, or at least 5 mm.

FIG. 5(b) shows the sensor device of FIG. 5(a) in enlarged view, and shows that three sensors S1, S2, S3 are located at the corners of an imaginary triangle. Preferably this triangle has a height over base ratio (R=H/B) in the range from 1% to 45%, or in the range from 2% to 45%, or in the range from 5% to 45%, or from 5% to 30%, or from 5% to 25%, or from 10% to 30%, for example equal to about 15%, or equal to about 20%, or equal to about 25%.

The principles of operation are largely the same as those explained above (where the sensors are located on an imaginary line), with the further advantage that the amplitudes of the first, second and third sensor signal H1, H2, H3 will typically differ slightly less from each other.

Figure 5C:
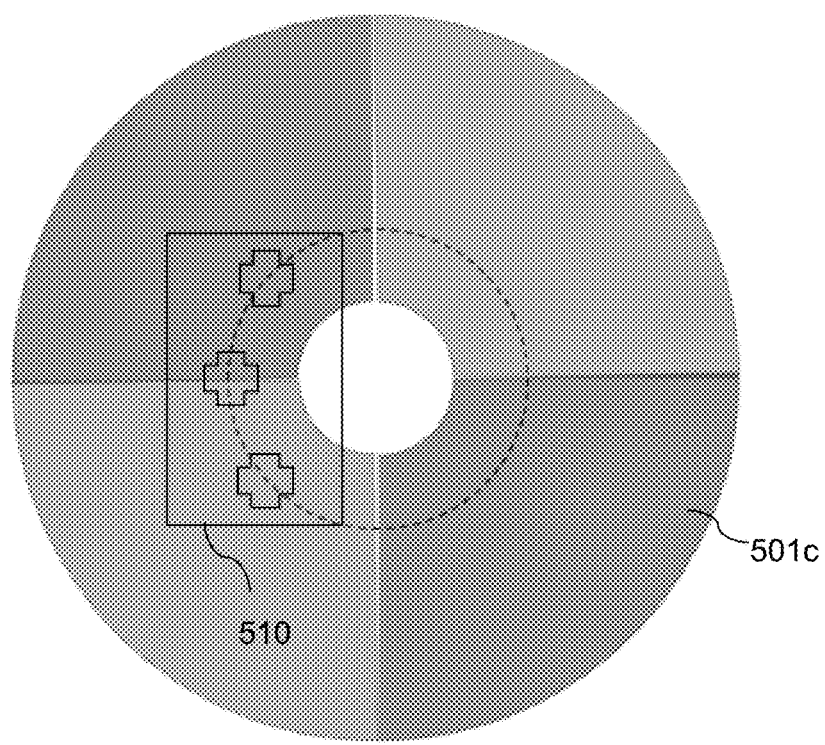
FIG. 5(c) to FIG. 5(e) show sensor arrangements comprising a specific sensor device according to FIG. 5(a) having particular dimensions, in combination with four-pole ring magnets of various sizes. In all of these cases the three sensor signals are substantially phase shifted over 90°. The radial position of the sensor device differs in the three cases.
Figure 5D:
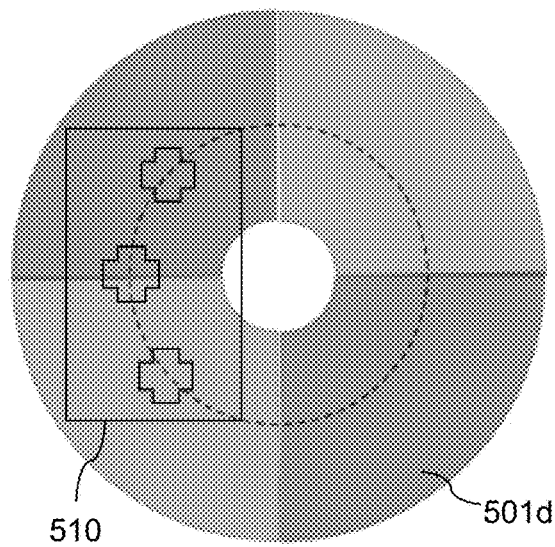
Figure 5E:
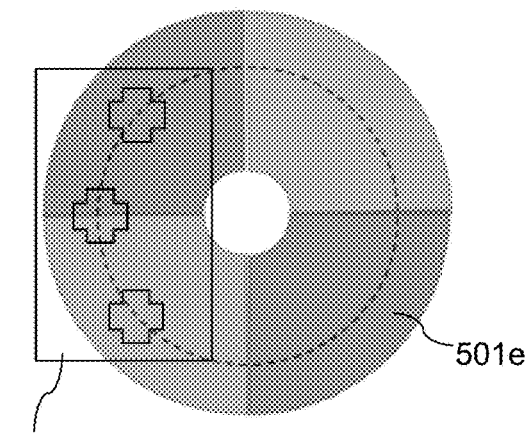

FIG. 5(c) to FIG. 5(e) show sensor arrangements comprising the sensor device of FIG. 5(a) in combination with four ring magnets of various sizes. In all of these cases the three sensor signals are substantially phase shifted over 90°. These figures illustrate that a sensor device 510 having three sensors S1, S2, S3 as shown, which are located on a triangle with H/B in the range specified above, and having a particular size, can advantageously be used with a plurality of ring magnets, the diameter of which may vary with a factor of about 200% between the largest (FIG. 5(c)) and the smallest (FIG. 5(e)). As illustrated, a predefined phase shift of for example ±90° between the signals H1, H2, H3 can be obtained by shifting the sensor device closer to, or further away from the shaft.

Thus, a particular sensor device 510 according to the present invention can be used in combination with magnetic sources 501c, 501d, 501d having various dimensions, even without performing a calibration, and without decreasing the accuracy, provided that an appropriate mounting position is chosen. As can be seen, the "magnetic center" of the three sensor locations, and/or the geometric center of the sensor locations is preferably not located on the rotation axis of the ring or disk magnet, but preferably located at a distance of at least 2 mm, or at least 2.5 mm, or at least 3 mm or at least 4 mm from the rotation axis. While the examples are shown for a sensor device having an offset of 90° between the sensor signals, of course a sensor device with another predefined offset, e.g. 75° or 60° or 45° (with known values for C and T, or α, or ε1 and ε2) can also be used.

Or stated differently, if the sensor device is configurable after mounting, e.g. by providing a value of C and T via a serial interface, or by downloading the values of a look-up table into the device after assembly, or by pulling one or more pins high or low to select an appropriate look-up-table, or in another suitable way, the mounting tolerances can be dramatically relaxed, as described next.

Figure 5F:
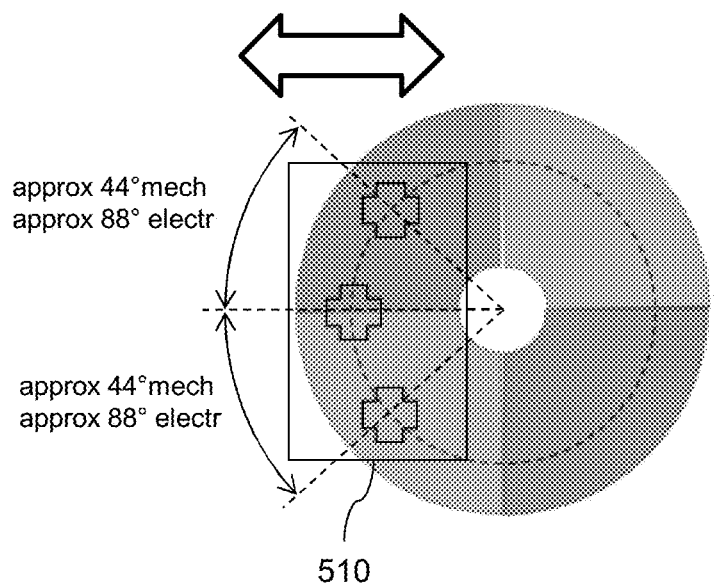
FIG. 5(f) to FIG. 5(g) illustrate by means of an example how the mounting requirements of a sensor arrangement comprising the sensor device of FIG. 5(a) can be relaxed without significant loss of accuracy, or stated in other words how mounting offset can be corrected, according to principles of the present invention.
Figure 5G:
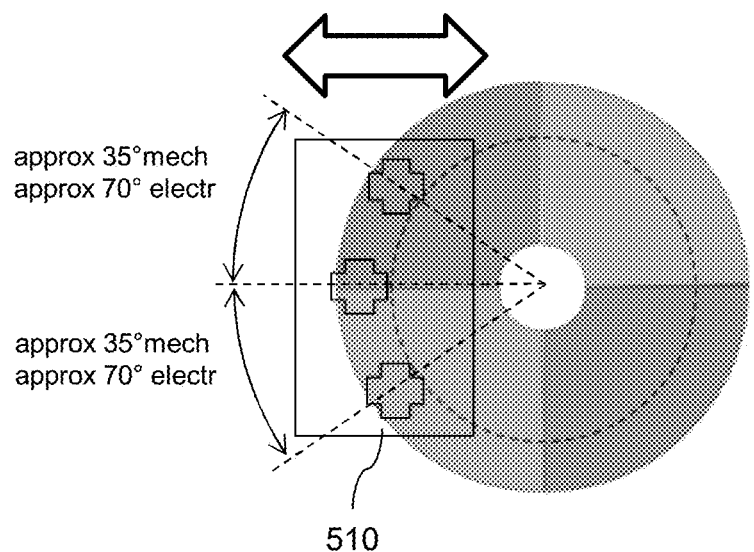

FIG. 5(f) and FIG. 5(g) illustrate by means of an example how a particular sensor device can be used in one sensor arrangement (FIG. 5(f)) in a manner in which the three sensor signals are phase shifted over about 88° electrical, while exactly the same sensor device can be used in another sensor arrangement (FIG. 5(g)) in a manner in which the three sensor signals are phase shifted over about 70° electrical. By configuring the device accordingly after mounting (e.g. by determining the values C and T described above, and by storing these values in a non-volatile memory during a calibration test, accurate results can be achieved during normal operation, despite the largely different mounting positions.

FIG. 6(a) shows an exemplary magnetic sensor arrangement 600, which can be seen as a variant of the sensor arrangement 400 shown in FIG. 4. The sensor device 610 comprising four sensors S1, S2, S3, S4 providing sensor signals H1, H2, H3, H4 respectively, which signals are substantially 30° phase shifted (electrically) with respect to one another. In the embodiment of FIG. 6(a) the four sensors S1, S2, S3, S4 are substantially located on a straight line, but that is not absolutely required.

FIG. 6(b) shows the sensor device 610 of FIG. 6(a), showing respective distances between the respective sensors. In preferred embodiments, the distances d12, d23 and d34 are identical.

FIG. 6(c) shows a variant of the sensor device of FIG. 6(b), where the four sensors are located at the corners of an imaginary trapezoidal shape. The trapezoidal shape may have a height over base ratio (R=H/B) in the range from about 2% to about 30%, or from 5% to 25%, or from 10% to 20%, for example equal to about 12%, or equal to about 14%, or equal to about 16% or equal to about 18%.

Figure 6D:
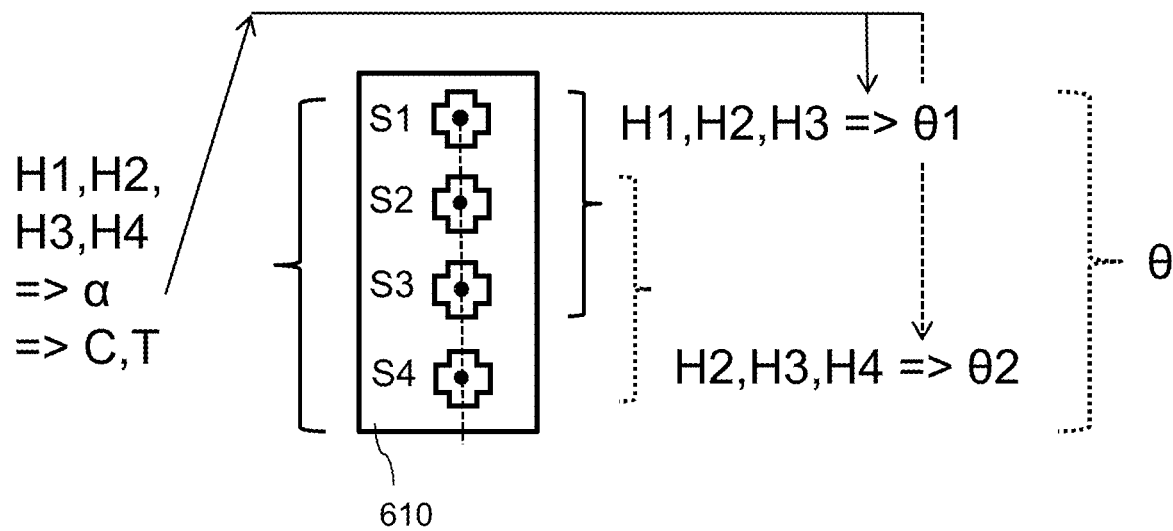
FIG. 6(d) schematically shows how a first set of three sensors out of the four sensors can be used to calculate a first position value, and how a second set of three sensors out of the four sensors can be used to calculate a second position value. Optionally the two values can be combined to obtain a single position value. Optionally the signals from the four sensors can be used for auto-calibration.

FIG. 6(d) schematically shows how the signals H1, H2, H3 from a first set of three sensors S1, S2, S3 selected from the group of four sensors can be used to calculate a first position value θ1 in a manner as described above (assuming the value of a is known, or the value of C and T are known, e.g. stored in non-volatile memory), and how the signals H2, H3, H4 from a second set of three sensors S2, S3, S4 selected from the group of four sensors can be used to calculate a second position value θ2 in a manner as described above (assuming the value of a is known, or the value of C and T are known, e.g. stored in a non-volatile memory), for example by using a look-up table, or by using the corrected arctan-function. If the sensors S1 to S4 are located equidistantly, the value of θ2 is equal to the value of θ1 phase shifted over α, thus:

$$\theta 2 = \theta 1 + \alpha \quad [7]$$

In an embodiment, the two position values θ1, θ2 are combined, in order to improve signal-to-noise ratio (SNR), for example as follows:

$$\theta = (\theta 1 + (\epsilon 2 - \alpha))/2 \quad [8]$$

In an embodiment the two position values θ1 and (θ2−α) are compared, and if they differ more than a predefined threshold, an error signal is provided. In this way an error can be detected.

In a particular embodiment, the sensor device is adapted to automatically determine the value of α, or the value of C and T in situ. This is particularly advantageous, since a calibration step (e.g. at the end-of a production-line) can be omitted. Or in other words, this sensor device can auto-configure or automatically calibrate itself. This will be described in FIG. 6(f) to FIG. 6(i), and a method of auto-calibration will be described in FIG. 11.

Figure 6E:
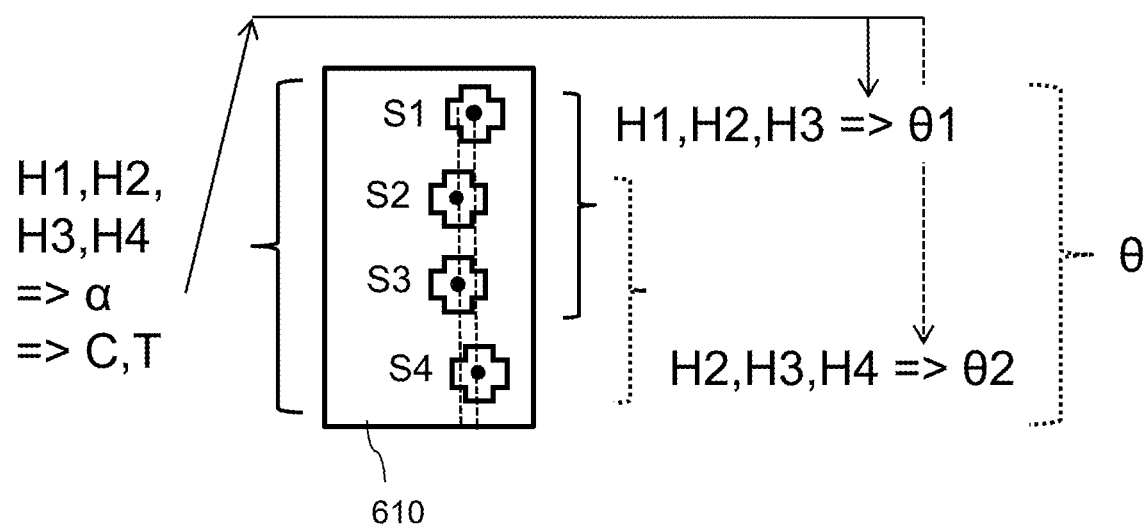
FIG. 6(e) shows a variant of the sensor device shown in FIG. 6(d) where the four sensors are located on an imaginary trapezoidal shape, the corners of which define two triangles.

FIG. 6(e) shows a variant of the sensor device shown in FIG. 6(d) where the four sensors are located on an imaginary trapezoidal shape, the corners of which define two triangles (a first triangle formed by sensors S1, S2, S3, and a second triangle formed by sensors S2, S3, S4). This offers the advantage that the amplitudes of the four signals would typically deviate slightly less from each other, and that a particular device can be used with a larger range of magnetic sources, e.g. permanent magnets, having various dimensions.

Figure 6F:
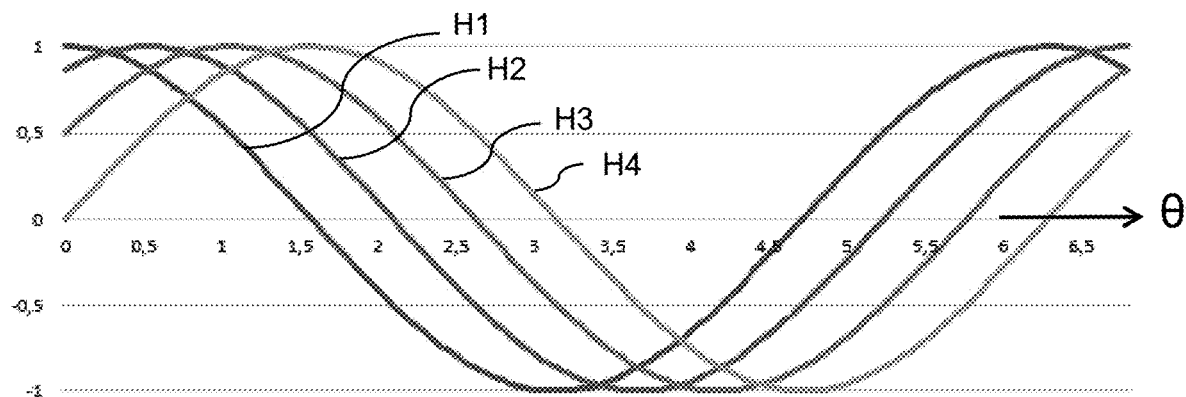
FIG. 6(f) show exemplary waveforms as can be obtained from the four sensors of the sensor device shown in FIG. 6(a) to FIG. 6(e).

FIG. 6(f) shows four exemplary sinusoidal waveforms H1, H2, H3, H4 as can be obtained from the four sensors S1, S2, S3, S4 of the sensor devices 610, shown in FIG. 6(a) to FIG. 6(e). As can be appreciated from FIG. 6(a), the sinusoidal signals have substantially the same amplitude, but are 30° phase shifted.

Figure 6G:
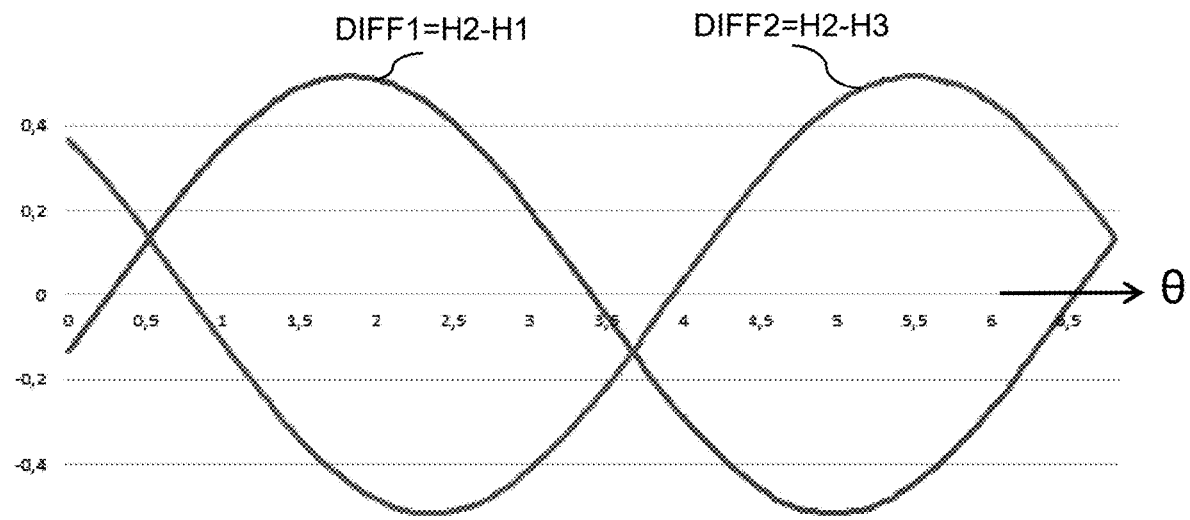
FIG. 6(g) shows two exemplary difference signals obtainable from a first set of three signals (H1, H2, H3) shown in FIG. 6(f), which can be seen as a variant of FIG. 3(c).

FIG. 6(g) shows two exemplary pairwise difference signals DIFF1=H2−H1 and DIFF2=H2−H3, obtainable from a first set of three signals (H1, H2, H3) shown in FIG. 6(f), which can be seen as a variant of FIG. 3(c).

Figure 6H:
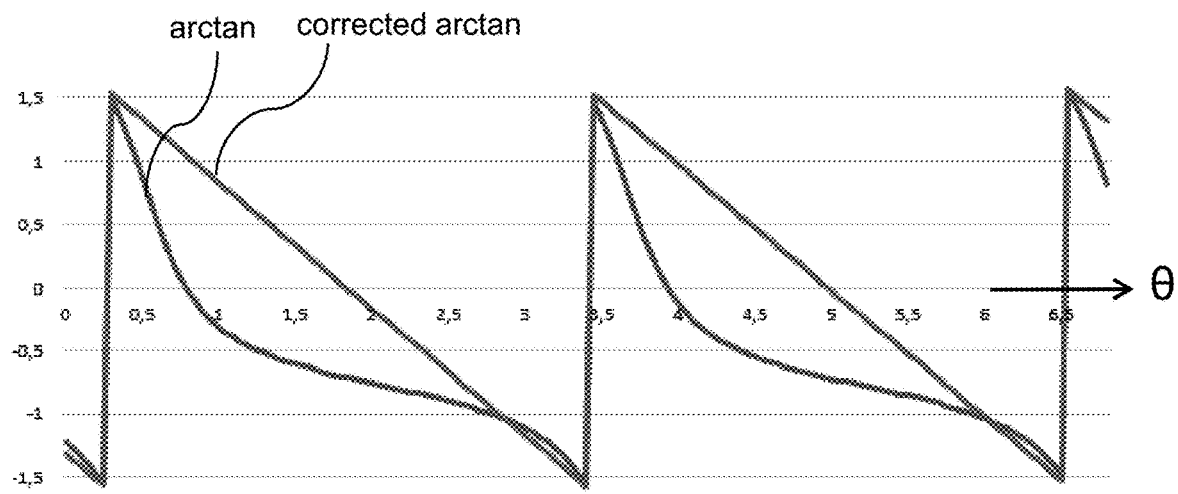
FIG. 6(h) shows two exemplary function plots (referred to herein as "uncorrected arctan-function" and "corrected arctan-function" respectively), similar to those shown in FIG. 3(d) and FIG. 3(e).

FIG. 6(h) shows two exemplary function plots, one referred to herein as the "uncorrected arctan-function", and the other referred to herein as the "corrected arctan-function". These functions are similar to those shown in FIG. 3(d) and FIG. 3(e), except that their sign is inverted, because DIFF2 in FIG. 6(g) is defined as H2−H3, whereas DIFF2 in FIG. 3(c) is defined as H3−H2. As already explained above (see FIGS. 3(a) to 3(g)), if the angular offset between the signals H1, H2, H3 (α=30° in FIG. 6(a)) is known, a value of C and T can be determined, for example, using the above mentioned formulas [4] and [5].

Thus in this example, C=cos(60°)≈0,500 and T= tan(60°)≈1.732, and the angular position θ1 of the first triangle formed by S1, S2, S3 can be calculated using formula [6].

Alternatively, it would also be possible to make use of a look-up table, which may be a predetermined look-up table (e.g. determined by design or by simulation), which may be used if the mounting tolerances are relatively low, or a look-up table which is determined at an end-of-line test (e.g. if the mounting tolerances are relatively large). In this case the value of α, C and T or ε1 and ε2 need not be calculated or determined, but the angular position value θ can be extracted from the look-up table, e.g. directly, or via interpolation.

Figure 6I:
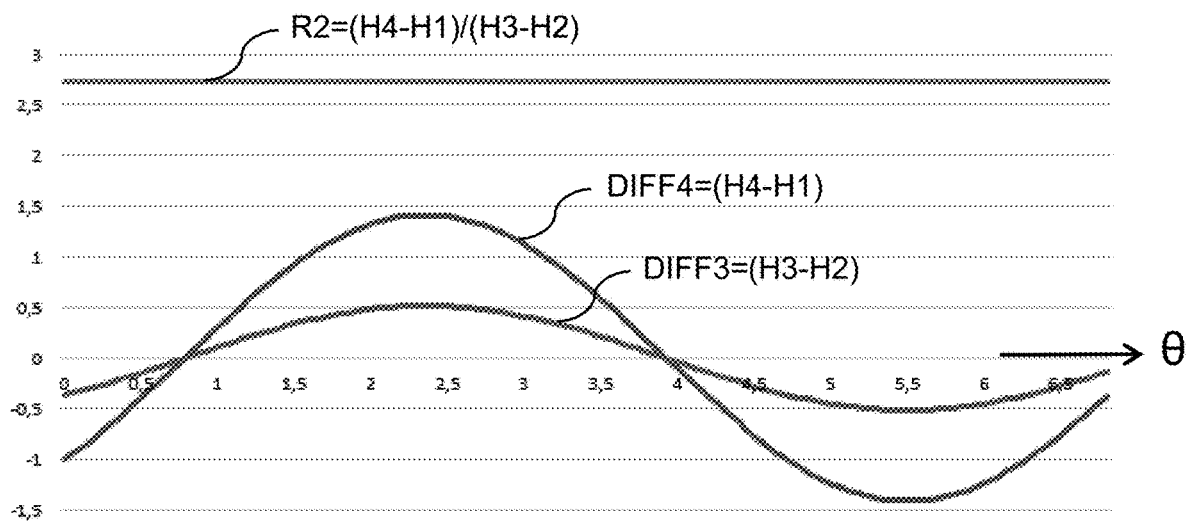
FIG. 6(i) shows waveforms of a difference between the inner sensors, and a difference between the outer sensors, and a ratio of these differences, which is substantially constant. This ratio can be used for auto-calibration.

In a similar manner, the second angular position θ2 of the second triangle formed by S2, S3, S4 can be calculated using similar formulas, but using the signals H2, H3, H4. As mentioned above, the second triangle is phase shifted with respect to the first triangle, which can be expressed mathematically by formula [7]. The position of the sensor device 610 relative to the magnetic source (or vice versa) may then be provided using formula [8];

FIG. 6(i) shows waveforms of a third difference DIFF3 between the inner sensor signals H2 and H3, and a fourth difference DIFF4 between the outer sensor signals H1 and H4 as a function of the angular position θ, and also shows a ratio of these differences R2=DIFF4/DIFF3, which is substantially constant. The inventors surprisingly found that the value of R2 is indicative of the phase offset α, or in other words, that the phase offset α can be determined based on the ratio R2.

In an embodiment where R2=(H4−H1)/(H3−H2), the value of α can be calculated or estimated based on the following formula:

$$\alpha = 90° - \arcsin[(R2-1)/2] \quad [9]$$

While the inventors do not wish to be bound by any theory, this may be understood as follows: (H4−H1) and (H3−H2) are in phase signals (see FIG. 6(i)), and the ratio is independent of the phase shift α. When the phase offset α approaches 0°, then R2 approaches 3.00; when the phase offset α approaches 30°, then R2 approaches 2.73; when the phase offset α approaches 45°, then R2 approaches 2.41; when the phase offset α approaches 60°, then R2 approaches 2.00; when the phase offset α approaches 90°, then R2 approaches 1.00.

Instead of using formula [9], the phase offset α can also be determined using a look-up table, and using the value of R2 as an index, optionally with interpolation.

This auto-calibration function can be used in the sensor device 610 for automatically determining the phase offset α of a particular sensor arrangement, without requiring an end-of-line calibration. The advantage of this feature should not be underestimated, because calibration at the end of a production line(EOL) is relatively expensive, and can be omitted with the device 610, and be replaced by an auto-calibration during a first use, or during start-up, etc. See also FIG. 11 which describes such a method. Another advantage of this embodiment is that the four sensors, e.g. four Hall elements can be located relatively close together, independent from the physical distance between the magnetic poles, and thus can be integrated on a single chip.

Figure 7:
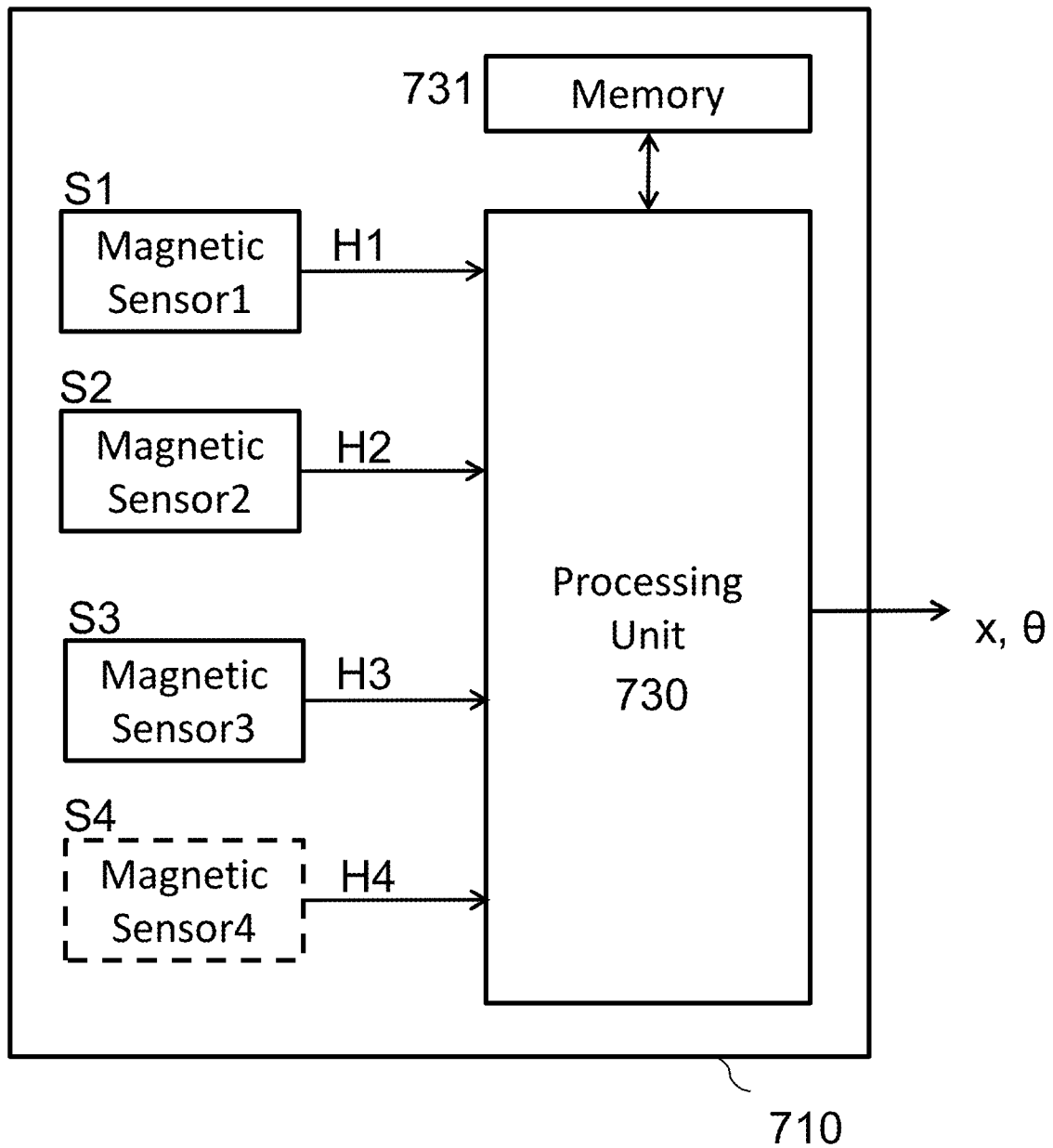
FIG. 7 shows an exemplary block diagram of a sensor device according to embodiments of the present invention.

FIG. 7 shows an electrical block-diagram of a circuit 710 that can be used in a position sensor device, e.g. as shown in any of FIG. 1(a) to FIG. 6(i).

The circuit 710 comprises a plurality of magnetic sensors, and a processing unit 730, and a non-volatile memory 731.

The plurality of magnetic sensors comprises at least three or exactly three magnetic sensors S1, S2, S3 (e.g. as in FIG. 1(a) to FIG. 5(g)) or comprises at least four or exactly four magnetic sensors S1, S2, S3, S4 (e.g. as in FIGS. 6(a) to 6(i)).

The processing unit 730 is adapted for determining the position, e.g. linear position x or angular position θ in manners as described above, for example by using a predefined single look-up table, or by using a look-up table stored in the sensor device 710 during a calibration test, or by using interpolation between multiple look-up tables, or by using a set of formulas (for example formula [1] in case the sensor signals are 90° phase shifted, or formula [6] in case the sensor signals are not phase shifted over 90°, but are e.g. phase shifted over an angle α in the range from about 10° to about 85°). As explained above, the position is based on a ratio of pairwise difference signals. The subtraction may be done in the analog domain before or after amplification, or in the digital domain.

The processing unit 730 may comprise a digital processor comprising or connected to a non-volatile memory 731 storing at least one constant value, for example one or more of ε1, ε2, α, C, T, R2. The digital processor may for example be an 8-bit processor, or a 16-bit processor.

While not explicitly shown, the processing circuit may comprise one or more components or sub-circuits selected from the group consisting of: an amplifier, a differential amplifier, an analog-to-digital convertor (ADC), etc. The ADC may have a resolution of at least 8 bits, or at least 10 bits, or at least 12 bits, or at least 14 bits, or at least 16 bits.

The processing unit 730 may provide the position as an analog signal or as a digital signal, for example via a digital interface, for example a serial bus interface, e.g. using the I²C protocol, or using RS232 protocol, or any other suitable protocol.

While not shown, in certain embodiments, for example the sensor device of FIGS. 6(*a*) to 6(*i*) with four sensors, the processing unit may have an error output for providing an error signal, for example when it is detected that the two position values (θ1+α/2) and (θ2−α/2) deviate more than a predefined threshold value.

Figure 8B:
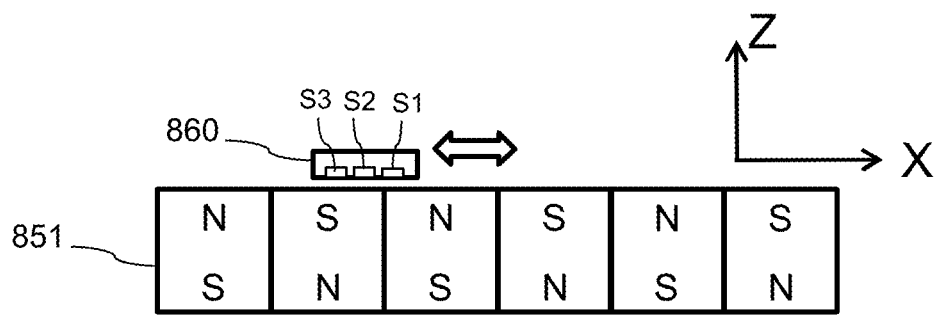
FIG. 8(b) shows a variant of the linear sensor system of FIG. 8(a) also comprising three sensors, but configured for providing three signals which are phase shifted over an angle considerably smaller than 90°, for example in the range from 20° to 85°, or from 30° to 80°.

FIG. 8(*a*) to FIG. 8(*c*) illustrate that the principles described above can also be applied to a linear position sensor.

FIG. 8(*a*) shows an exemplary embodiment of a linear sensor arrangement 800, comprising a sensor device 810 movably arranged with respect to a magnetic structure 801, or vice versa. The sensor device 810 comprises three sensors S1, S2, S3 configured for measuring three signals H1, H2, H3 which are 90° phase shifted. The magnetic structure 801 comprises a plurality of alternating North and South poles, arranged equidistantly along the axis of movement X. The sensor device 810 may be movable, while the magnetic structure or strip 801 is fixed, or vice versa. The waveforms obtained by the sensors S1, S2, S3 are identical or similar to those shown in FIGS. 1(*a*) to 1(*d*), and formula [1] with the arctan function of the ratio of two pairwise difference signals can be used to determine the position x on the X-axis. As can be seen, in this case, the dimensions of the sensor device 810 and the dimensions of the magnetic structure 801 are matched.

FIG. 8(*b*) shows an exemplary embodiment of a linear sensor arrangement 850, comprising a sensor device 860 movably arranged with respect to a magnetic structure 851, or vice versa. The sensor device 860 comprises three sensors S1, S2, S3 configured for measuring three signals H1, H2, H3 which are less than 90° phase shifted, for example phase shifted over an angle in the range from 5° to 85°, or from 10° to 85°, or from 20° to 85°, or from 10° to 80°, or from 20° to 80°. The magnetic structure 851 comprises a plurality of alternating North and South poles, arranged equidistantly along the axis of movement X. The sensor device 860 may be movable, while the magnetic structure or strip 801 is fixed, or vice versa. The waveforms obtained by the sensors S1, S2, S3 are identical or similar to those shown in FIG. 2(*b*) or FIG. 3(*b*) or FIG. 3(*f*). The relative position x on the X-axis can be determined based on a ratio of two pairwise difference signals, for example as an index in a look-up table, or as an argument of a function, for example the "corrected arctan function" described in FIG. 2(*e*) and FIG. 3(*e*), and expressed by formula [6].

As can be seen, the dimensions of the sensor device 860 and the dimensions of the magnetic structure 851 may, but need not be matched, or are not matched, but instead, can be chosen independently. As mentioned above, this offers (inter alia) the advantage that a sensor device having particular dimensions can be used with a variety of magnetic structures having various dimensions. The processing unit 730 of the sensor device may be configured, e.g. hard-coded to calculate the position based on a predetermined phase-offset α or a value of C and T (as described above), or may be configured to select a particular phase offset value α from a plurality of predefined phase offset values (e.g. using one or more input pins which are pulled-up or pulled down, or to which an analog voltage is applied indicative of such selection, or via a serial port), and/or may be configured to use one or more look-up tables, and/or may be configured to determine the position x in accordance with the corrected arctan-function as expressed by formula [6].

FIG. 8(*c*) shows an exemplary embodiment of a linear sensor arrangement 870, comprising a sensor device 880 movably arranged with respect to a magnetic structure 871, or vice versa. The sensor device 860 comprises four sensors S1, S2, S3, S4 configured for measuring four sinusoidal signals H1, H2, H3, H4 which are preferably less than 90° phase shifted, for example phase shifted over an angle α in the range from 10° to 85°, or from 10° to 85°, or from 20° to 85°, or from 10° to 80°, or from 20° to 80°. The four sensors S1 to S4 are preferably equidistantly located on an imaginary line. The magnetic structure 871 comprises a plurality of alternating North and South poles, arranged equidistantly along the axis of movement X. The sensor device 880 may be movable, while the magnetic structure or strip 871 is fixed, or vice versa. The waveforms obtained by the sensors S1, S2, S3, S4 are identical or similar to those shown in FIG. 6(*f*). A first linear position value x1 can be determined based on the signals H1, H2, H3 obtained from the sensors S1, S2, S3 (as in FIG. 6(*d*)), and a second linear position value x2 can be determined based on the signals H2, H3, H4 obtained from the sensors S2, S3, S4 (as in FIG. 6(*d*)), each based on a ratio of two pairwise difference signals selected from three signals where one signal is used in both difference signals, by making use of one or more look-up table(s) or a mathematical function (see e.g. formula [6]). Each of the two position values is indicative of the position of the sensor device relative to the magnetic source, but the two values are slightly offset over a constant value "dx" corresponding to the phase shift α between the signals.

Similar to formula [7], the second distance value x2 should be equal to:

$$x2 = x1 + dx \quad [10]$$

where dx is a constant value. In an embodiment, the two position values x1, x2 are combined, in order to improve signal-to-noise ratio (SNR), for example as follows:

$$x = (x1 + (x2 - dx))/2 \quad [11]$$

which can also be written as:

$$x = (x1 + dx/2) + (x2 - dx/2) \quad [12]$$

Optionally the sensor arrangement 870 is adapted for providing an error signal if the two positions (x1+dx/2) and (x2−dx/2) deviate more than a predefined threshold, e.g. more than 5%, or more than 4%, or more than 3%, or more than 2%, or more than 1% of the measurable range.

Figure 11:
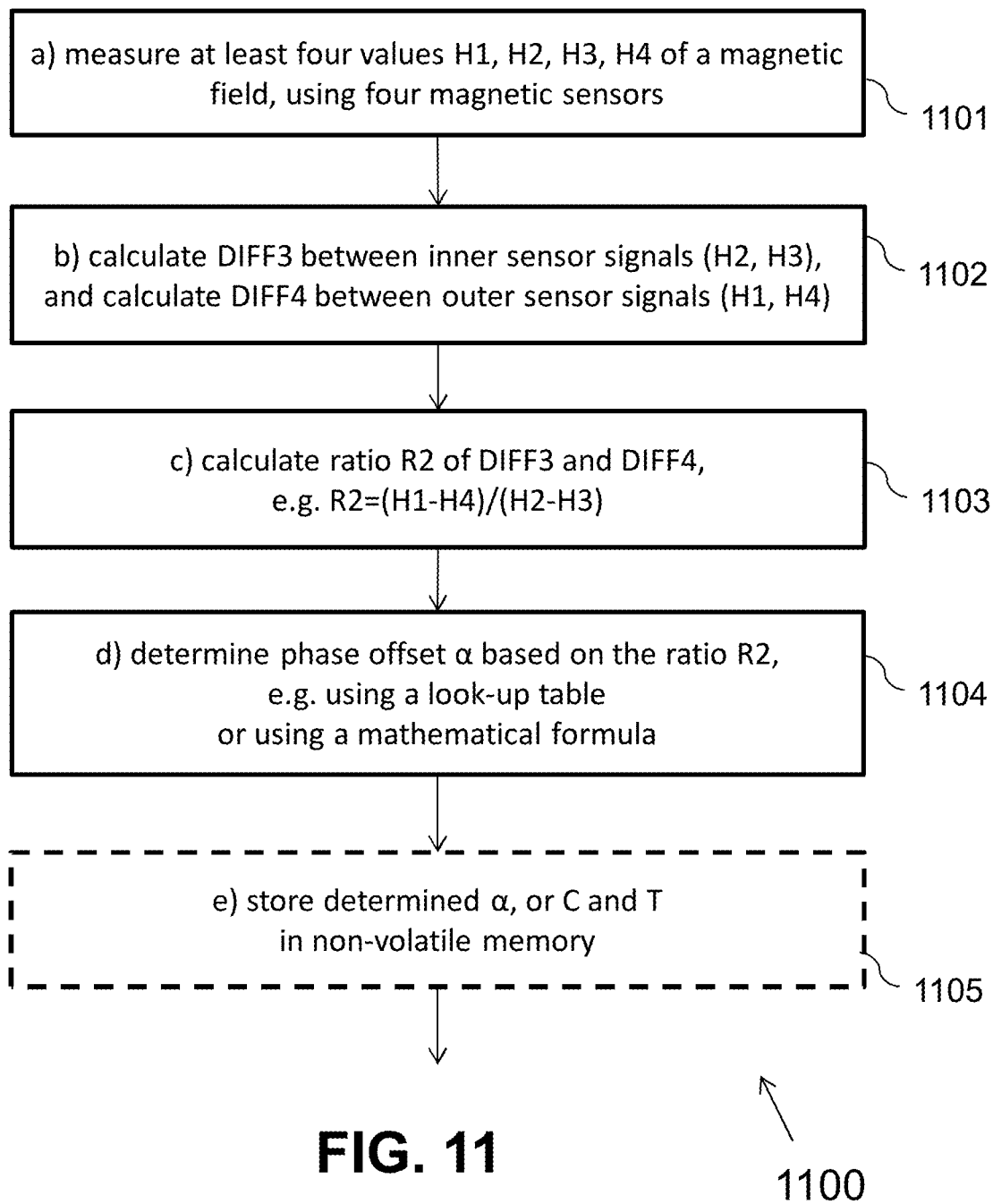
FIG. 11 shows a method of auto-calibrating a sensor arrangement according to an embodiment of the present invention, which may optionally be used in the sensor arrangement of FIGS. 6(a) to 6(i).

Optionally, the sensor arrangement 870 is adapted for auto-calibration "in the field", e.g. upon power-on, or upon its first use, as explained in FIG. 11.

Each of the sensors S1, S2, S3, and if present S4 of the sensor device 810 of FIG. 8(*a*) to FIG. 8(*c*) may for example comprise one horizontal Hall element adapted for measuring a magnetic field component Bz, hence the axes of maximum sensitivity of the three sensor elements are oriented parallel, thus an external disturbance field (if present) has the same effect on each of them, and subtraction of two of these signals cancels the external field.

In another embodiment, each of the sensors S1, S2, S3 and if present also S4 comprises one vertical Hall element adapted for measuring a magnetic field component Bx in the X-direction. Again, since the vertical Hall elements are oriented in the same direction (in this example the X-direction), the influence of a constant disturbance field cancels out when subtracting two of these signals.

In yet another embodiment, each of the sensors S1, S2, S3 and if present also S4 comprises one vertical Hall element adapted for measuring a magnetic field component By in the Y-direction. Again, since the vertical Hall elements are oriented in the same direction (in this example the Y-direction), the influence of a constant disturbance field cancels out when subtracting two of these signals.

In fact, this is applicable for other embodiments of the present invention. Thus, for example, while not explicitly shown, the embodiment of FIG. 5(b) would also work if three vertical Hall elements were used located at the respective sensor positions, provided that these vertical Hall elements are oriented in the same direction (e.g. all in the X-direction, or all in the Y-direction).

Figure 8C:
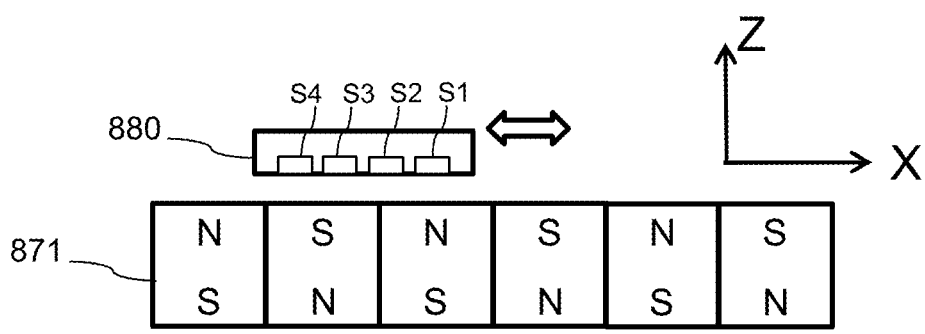
FIG. 8(c) shows a variant of the linear sensor system of FIG. 8(b) having four sensors spaced so as to measure four signals which are phase shifted over angles smaller than 90°, for example in the range from 20° to 85°, or from 30° to 80°.
Figure 9:
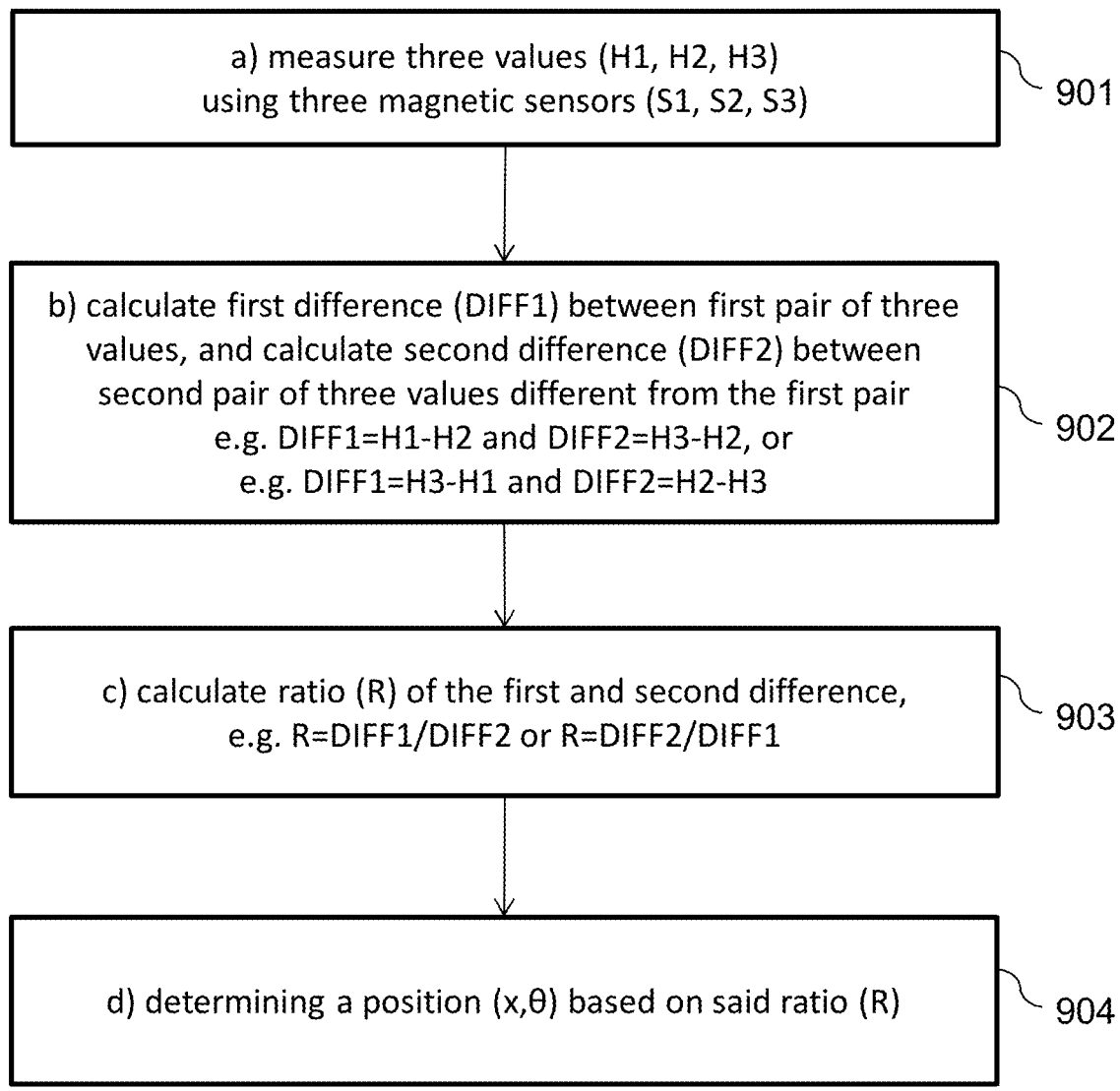
FIG. 9 shows a method of calculating a position of a sensor device relative to a magnetic source having at least two poles, according to an embodiment of the present invention, which can be used in the sensor arrangements of FIGS. 1(a) to FIG. 8(c).

FIG. 9 shows a method 900 of determining a position x, θ of a sensor device relative to a magnetic source having at least two, or at least four, or at least six, or at least eight poles, as can be used in the sensor arrangements illustrated in FIG. 1(a) to FIG. 8(c). The method 900 comprises the steps of:
- a) measuring 901 at least three values H1, H2, H3 of a magnetic field, using at least three magnetic sensors S1, S2, S3;
- b) generating or calculating 902 a first difference DIFF1 between a first pair of these at least three values, and generating or calculating a second difference DIFF2 between a second pair of these three values, the second pair being different from the first pair;
- c) calculating 903 a ratio R of the first and the second difference;
- d) determining 904 a position x, θ based on said ratio R.

Step a) may comprise measuring exactly three values, or measuring exactly four values.

Step b) may comprise: generating said first and second difference signal in the analog domain (e.g. using an op-amp) and then digitizing the difference signal, or may comprise: digitizing the individual sensor signals, and then performing the subtraction in the digital domain.

Preferably one of the three signals is used both in the first difference and in the second difference.

In an embodiment, the signal that is used in both differences is the signal S2 provided by the central sensor element.

In an embodiment, the signal that is used in both differences is the signal S1, or the signal S3 provided by one of the outer sensor elements.

Step c) is preferably performed in the digital domain, e.g. by a processing unit. This processing unit is preferably part of the sensor device, but that is not absolutely required.

In an embodiment, step d) comprises: determining said position x, θ using interpolation in a single look-up table. The look-up table is preferably stored in a non-volatile memory of the sensor device. The values of the look-up tables may be predefined (e.g. during design), or may be generated during a calibration-test and stored in a non-volatile memory. Alternatively, the values may be calculated upon start-up of the device and written in a volatile memory (RAM) of the sensor device based on one or more constants stored in a non-volatile memory device during a calibration (e.g. α, or C and T).

In an embodiment, step d) comprises: determining said position x, θ using interpolation between at least two look-up tables.

In an embodiment, step d) comprises: determining said position using an arctan function, for example by evaluating any of the formulas [1] to [11] described above.

FIG. 10 shows a method of calibrating a sensor arrangement as shown for example in FIGS. 1(a) to 1(d) or FIGS. 2(a) to 2(e) or FIGS. 3(a) to 3(g) or FIG. 4 or FIGS. 5(a) to 5(g), or FIGS. 6(a) to 6(i), or FIGS. 8(a) to 8(c). It is noted, however, that such calibration is not absolutely required, for example in the embodiment of FIG. 6(a) or FIG. 8(c) which are capable of performing an auto-calibration, or for example in case of FIG. 1(a) to FIG. 5(a) in case the mounting position is sufficiently accurate. In this case a predetermined look-up table, or a formula with predefined constants (e.g. α, or C and T, determined during design or by simulation) can be used.

The method of FIG. 10 is particularly interesting for building a look-up table during development, or for building a look-up table at the end of production for cases where the mounting position (e.g. the distance between the sensor device and a rotary shaft) is not highly accurate, and/or where tolerances on the magnetization of the magnetic source are relatively high, and/or for achieving an improved accuracy, or for other reasons.

The method 1000 of calibrating a sensor arrangement comprises the steps of:
- a) bringing 1001a a sensor device and a magnet source in a known relative position x, θ, and measuring 1001b at least three values H1, H2, H3 using at least three magnetic sensors S1, S2, S3 arranged as described above (e.g. on a straight line, or on an imaginary triangle);
- b) calculating 1002 a first pairwise difference DIFF1 between a first pair of said at least three values, and calculating a second pairwise difference DIFF2 between a second pair of said at least three values, the second pair being different from the first pair, and preferably one sensor signal being used in both the first pair and in the second pair;
- c) calculating 1003 a ratio of the first difference DIFF1 and the second difference DIFF2;

Repeating step a) to c), for example a predefined number of times, or until a predefined criterion is met (e.g. when one period is sampled);
- d) storing 1005 the values of the relative positions x, θ and the corresponding ratio's R in a non-volatile memory of the sensor device (e.g. in flash or EEPROM).

Depending on the implementation, step d) may be performed only once (e.g. after all measurements are taken), or after each individual measurement inside the loop.

FIG. 11 shows a method 1100 of auto-calibrating a sensor arrangement, as may be used in the sensor arrangement 600 shown in FIG. 6(a) to FIG. 6(e) and the sensor arrangement of FIG. 8(c). The method 1100 comprises the steps of:
- a) measuring 1101 exactly four or at least four values H1, H2, H3, H4 of a magnetic field, using at least four magnetic sensors S1, S2, S3, S4 arranged as described above (e.g. on a straight line, or on an imaginary trapezium);
- b) calculating 1102 a third pairwise difference DIFF3 between the values obtained from the inner sensors S2, S3, and calculating a fourth pairwise difference DIFF4 between the values obtained from the outer sensors S1, S4;
- c) calculating 1103 a ratio R2 of the third and the fourth second difference DIFF3, DIFF4;

d) determining 1104 a (phase offset) value α based on this ratio R2, for example using a look-up table or using a mathematical formula (for example using formula [9]).

The method may further comprise the optional step e) of: storing 1105 one or more of the value α, or the value C and T, or values derived therefrom, in a non-volatile memory of the sensor device.

While not shown in FIG. 11, the method may further comprise: generating a look-up table (e.g. having two columns, one for the ratio R of difference signals, and one for the position x or θ based on said value α, (e.g. based on the values C and T derived from a), and storing said table in non-volatile memory e.g. Flash, (e.g. during a calibration-test, or during a first use of the device, or upon each power-on of the device), or storing said table in RANI during each power-on. During the actual use of the device, the position can then be determined based on said look-up table.

While the present invention is illustrated above for a four-pole ring magnet, FIG. 12(*a*) and FIG. 12(*b*) illustrate that the present invention also works for a two-pole magnet, for example a two-pole ring magnet, or a two-pole disk magnet, or a two-pole bar magnet, etc.

Figure 12A:
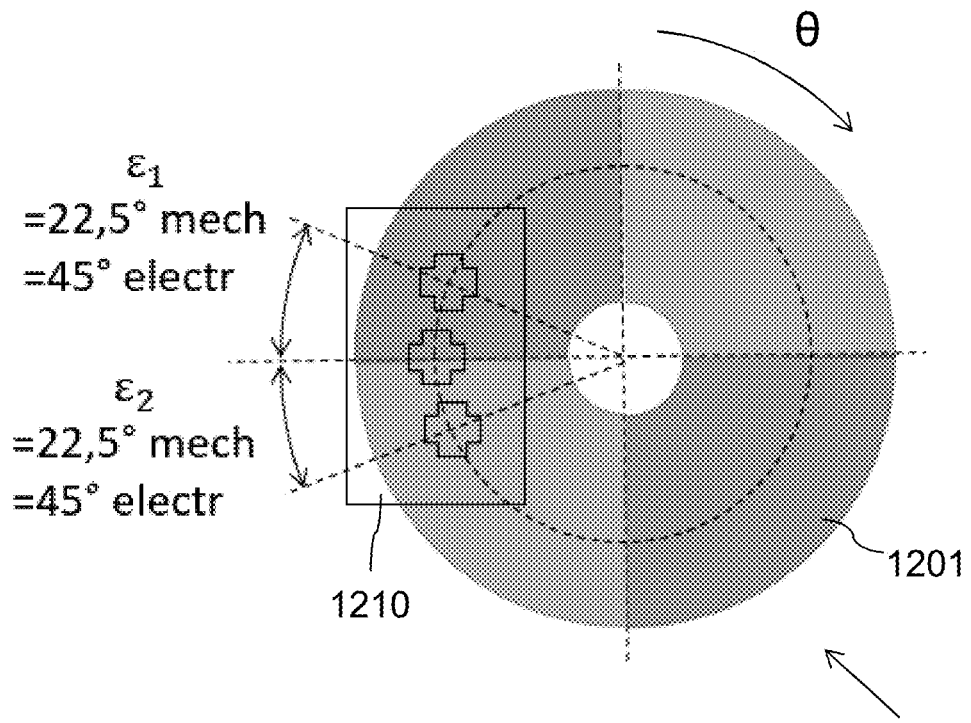
FIG. 12(a) and FIG. 12(b) illustrate that the present invention also works for a two-pole magnet.
Figure 12B:
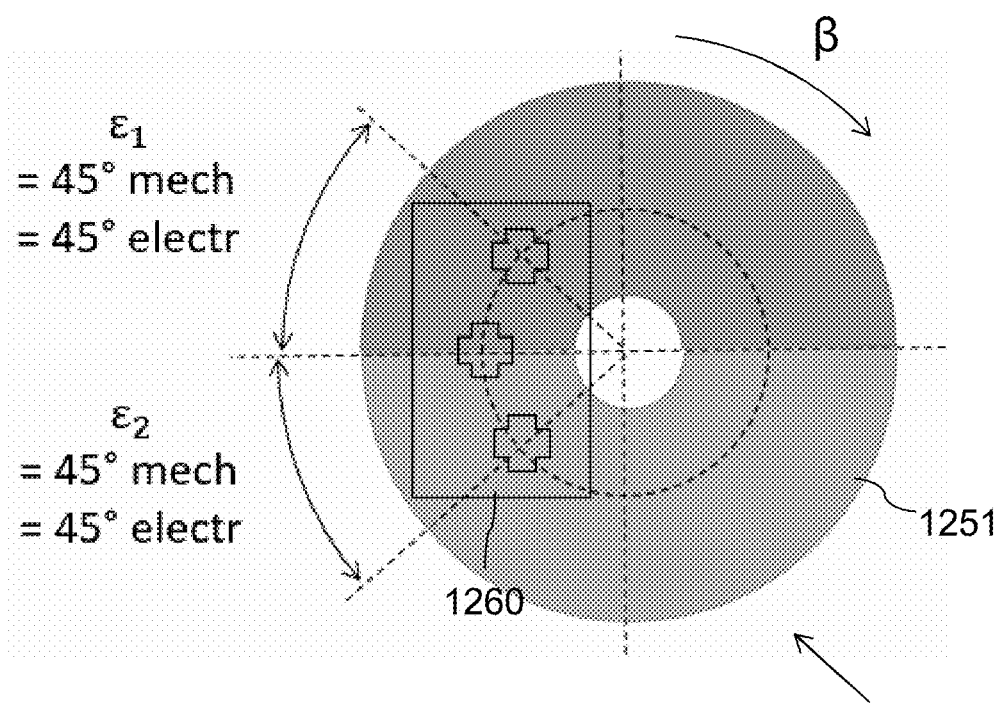
Figure 13A:
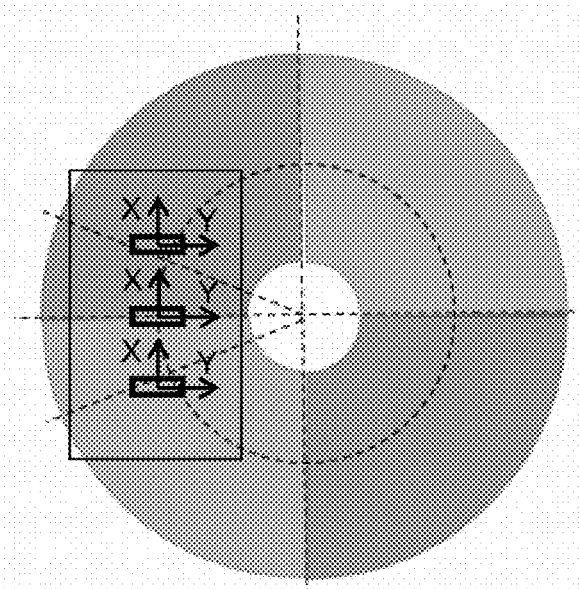
FIG. 13(a) to FIG. 13(d) illustrate that the present invention also works for sensor devices configured for measuring a magnetic field in a direction parallel to the semiconductor substrate of the sensor device, e.g. using vertical Hall elements.
Figure 13B:
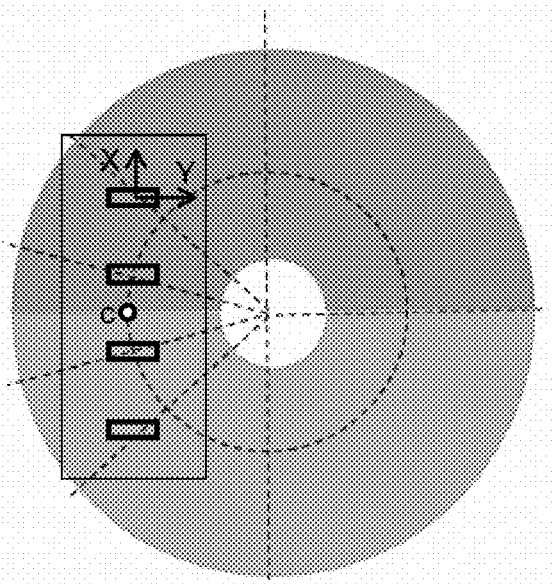
Figure 13C:
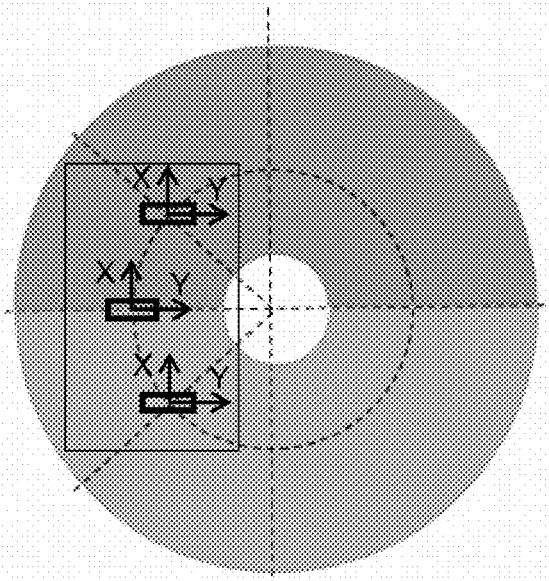
Figure 13D:
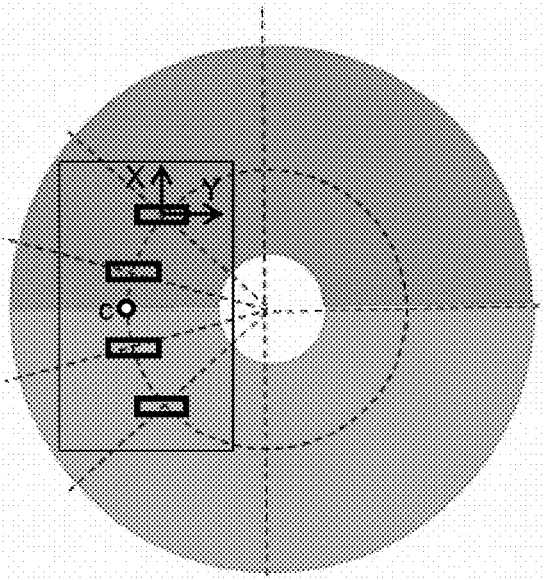

FIG. 12(*a*) is a replica of FIG. 3(*a*), showing a sensor system 1200 with a four-pole ring magnet 1201, and a sensor device 1210 having three magnetic sensors S1, S2, S3 adapted for providing three sensor signals H1, H2, H3 which are 45° phase shifted (as shown in FIG. 3(*b*)).

FIG. 12(*b*) shows a sensor system 1250 according to another embodiment of the present invention, having a two-pole ring magnet 1251, e.g. an axially or diametrically magnetized ring or disk magnet, and a sensor device 1260 with three magnetic sensors.

As can be appreciated when comparing FIG. 12(*a*) and FIG. 12(*b*), the electrical signals H1, H2, H3 provided by the sensor device 1210 as a function of θ are very similar to the electrical signals H1, H2, H3 provided by the sensor device 1260, except for a scaling factor of the angular coordinate-axis. Indeed, identical signals would be obtained if the magnet 1201 rotates over an angle θ of for example 20°, and the magnet 1251 rotates over an angle β of 40°.

The same advantages as mentioned above are applicable:
the dimensions of the sensor device need not match the dimensions of the magnet, or stated differently: the sensor device can be made smaller than the magnet (e.g. if a fixed look-up table is stored in the device but mounting accuracy is high; or if a look-up table or one or more parameters, e.g. α, C, T are stored in a non-volatile memory of the sensor device after mounting);

the mounting tolerances can be relaxed without losing accuracy (e.g. if a calibration is performed, after mounting);

the accuracy can be improved even if the mounting position is not highly accurate (e.g. if a calibration is performed, after mounting).

In a variant (not shown) of the embodiment shown in FIG. 12(*b*), the magnet is also a two-pole magnet, but the sensor device has four sensor elements. In this case, the value of the phase shift α can be determined automatically in an auto-calibration, similar as described in FIGS. 6(*a*) to 6(*i*) and FIG. 11.

While the invention has been illustrated above mainly showing ring magnets, the invention will also work with disk magnets.

While the invention has been illustrated above showing mainly horizontal Hall elements as sensor elements (configured for measuring the Bz-component in a plane perpendicular to the semiconductor plane), the invention also works with other magnetic sensors, for example comprising or consisting of vertical Hall elements configured for measuring the Bx-field, as shown for example in FIG. 13(*a*) and FIG. 13(*c*), where the X-direction is tangential to an imaginary circle for the second sensor element (located substantially between the first and third sensor element). This can be understood by those skilled in the art, because the Bx signals obtained from these vertical Hall elements are 90° phase shifted with respect to the Bz-signals obtained from horizontal Hall elements located at the respective positions. Likewise, the Bx-signals obtained from the vertical Hall elements of FIG. 13(*b*) and FIG. 13(*d*) are 90° phase shifted with respect to the Bz-signals obtained from horizontal Hall elements located at the respective positions. The X-direction can be defined in this case as being tangential to an imaginary circle running through an imaginary point c located in the middle between the two central elements.

While individual features are explained in different drawings and different embodiments of the present invention, it is contemplated that features of different embodiments can be combined, as would be obvious to the skilled person, when reading this document.

The invention claimed is:

1. A position sensor arrangement, comprising:
   a magnetic field source for generating a magnetic field having at least two poles;
   a position sensor device movably arranged relative to the magnetic field source or vice versa, and comprising:
   at least three magnetic sensors, including a first magnetic sensor, a second magnetic sensor, and a third magnetic sensor, each adapted for measuring a respective value of said magnetic field;
   the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal;
   the first magnetic sensor, the second magnetic sensor, and the third magnetic sensor being arranged such that the second magnetic sensor is located substantially between the first magnetic sensor and the third magnetic sensor, and such that the first magnetic sensor, the second magnetic sensor, and the third magnetic sensor are arranged on a straight line or at the corners of an imaginary triangle having a height over base ratio in the range from 1% to 45%;
   a processing unit connected to the at least three magnetic sensors for obtaining the first signal, the second signal, and the third signal, and configured for determining a position of the position sensor device relative to the magnetic field source based on a ratio of a first pairwise difference and a second pairwise difference;
   the first pairwise difference being a difference of a first pair of two signals selected from said first signal, the second signal, and the third signal;
   the second pairwise difference signal being a difference of a second pair of two signals selected from said first signal, said second signal, and said third signal;
   the second pair being different from the first pair; and
   one of the first signal, the second signal, and the third signal being used both in the first pair and in the second pair,
   wherein the processing unit is adapted for calculating said relative position based on the formula: $\theta = \arctan(R)$, wherein R=DIFF1/DIFF2,
wherein DIFF1 is the first pairwise difference and DIFF2 is the second pairwise difference,
wherein DIFF1=(H1−H2) or DIFF1=(H2−H1),
wherein DIFF2=(H3−H2) or DIFF2=(H2−H3), and
wherein H1 is the first signal, H2 is the second signal, and H3 is the third signal.

2. The position sensor arrangement according to claim 1, wherein the first magnetic sensor, the second magnetic sensor, and the third magnetic sensor are located relative to the magnetic field source in such a way that the second signal is substantially equal to the first signal but phase shifted over a first predefined offset, and such that the third signal is substantially equal to the second signal but phase shifted over a second predefined offset.

3. The position sensor arrangement according to claim 2, wherein the first predefined offset is substantially equal to the second predefined offset.

4. The position sensor arrangement according to claim 1, wherein the magnetic sensors are horizontal Hall elements, or
wherein the magnetic sensors are vertical Hall elements.

5. The position sensor arrangement according to claim 1, wherein the position sensor arrangement is a linear position sensor arrangement,
wherein the magnetic field source is a magnetic structure comprising a plurality of alternating North and South poles arranged equidistantly along an axis of movement; and
wherein the position sensor device is adapted for determining a position along said axis.

6. The position sensor arrangement according to claim 1, wherein the position sensor arrangement is an angular position sensor arrangement,
wherein the magnetic field source is a ring magnet or a disk magnet, rotatable about an axis; and
wherein the position sensor device is adapted for determining an angular position.

7. The position sensor arrangement according to claim 6, wherein the magnetic field source is an axially magnetized two-pole ring magnet, or
wherein the magnetic field source is an axially magnetized two-pole disk magnet, or
wherein the magnetic field source is a diametrically magnetized two-pole ring magnet, or
wherein the magnetic field source is a diametrically magnetized two-pole disk magnet.

8. The position sensor arrangement according to claim 6, wherein the magnetic field source is an axially magnetized four-pole ring magnet, or
wherein the magnetic field source is an axially magnetized four-pole disk magnet.

9. A position sensor arrangement, comprising:
a magnetic field source for generating a magnetic field having at least two poles;
a position sensor device movably arranged relative to the magnetic field source or vice versa, and comprising:
at least three magnetic sensors, including a first magnetic sensor, a second magnetic sensor, and a third magnetic sensor, each adapted for measuring a respective value of said magnetic field;
the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal;
the first magnetic sensor, the second magnetic sensor, and the third magnetic sensor being arranged such that the second magnetic sensor is located substantially between the first magnetic sensor and the third magnetic sensor, and such that the first magnetic sensor, the second magnetic sensor, and the third magnetic sensor are arranged on a straight line or at the corners of an imaginary triangle having a height over base ratio in the range from 1% to 45%;
a processing unit connected to the at least three magnetic sensors for obtaining the first signal, the second signal, and the third signal, and configured for determining a position of the position sensor device relative to the magnetic field source based on a ratio of a first pairwise difference and a second pairwise difference;
the first pairwise difference being a difference of a first pair of two signals selected from said first signal, the second signal, and the third signal;
the second pairwise difference signal being a difference of a second pair of two signals selected from said first signal, said second signal, and said third signal;
the second pair being different from the first pair; and
one of the first signal, the second signal, and the third signal being used both in the first pair and in the second pair,
wherein the processing unit is adapted for calculating said relative position based on the formula:

$$\theta=\arctan(R/C \pm T),$$

wherein R=DIFF1/DIFF2,
wherein DIFF1 is the first pairwise difference and DIFF2 is the second pairwise difference,
wherein DIFF1=(H1−H2) or DIFF1=(H2−H1),
wherein DIFF2=(H3−H2) or DIFF2=(H2−H3),
wherein H1 is the first signal, H2 is the second signal, and H3 is the third signal, and
wherein C is a predefined constant different from 1.0 and/or T is a predefined constant different from 0.0.

10. The position sensor arrangement according to claim 9, wherein the value of C and T are calculated based on the following formulas:

$$C=\cos(\varphi), \text{ and}$$

$$T=\tan(\varphi),$$

wherein $\varphi$ is a constant value different from 0°.

11. The position sensor arrangement according to claim 9, wherein the magnetic position sensor further comprises at least a fourth magnetic sensor adapted for measuring a respective value of said magnetic field, and having a fourth axis of maximum sensitivity parallel to the first axis and configured for providing a fourth signal,
wherein the fourth magnetic sensor is arranged such that the third magnetic sensor is located substantially between the second magnetic sensor and the fourth magnetic sensor, and such that the first magnetic sensor, second magnetic sensor, third magnetic sensor, and the fourth magnetic sensor are arranged at the corners of an imaginary trapezium having a height over base ratio smaller than 30%;
wherein the processing unit is further connected to the fourth magnetic sensor for obtaining the fourth signal;
wherein the processing unit is further adapted for calculating a second ratio between a third difference being a difference between the two signals from the outer magnetic sensors, and a fourth difference being a difference between the two signals from the inner sensors;

wherein the processing unit is further adapted for determining a value of the constant φ based on this second ratio.

12. A position sensor arrangement, comprising:

a magnetic field source for generating a magnetic field having at least two poles;

a position sensor device movably arranged relative to the magnetic field source or vice versa, and comprising:

at least three magnetic sensors, including a first magnetic sensor, a second magnetic sensor, and a third magnetic sensor, each adapted for measuring a respective value of said magnetic field;

the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal;

the first magnetic sensor, the second magnetic sensor, and the third magnetic sensor being arranged such that the second magnetic sensor is located substantially between the first magnetic sensor and the third magnetic sensor, and such that the first magnetic sensor, the second magnetic sensor, and the third magnetic sensor are arranged on a straight line or at the corners of an imaginary triangle having a height over base ratio in the range from 1% to 45%;

a processing unit connected to the at least three magnetic sensors for obtaining the first signal, the second signal, and the third signal, and configured for determining a position of the position sensor device relative to the magnetic field source based on a ratio of a first pairwise difference and a second pairwise difference;

the first pairwise difference being a difference of a first pair of two signals selected from said first signal, said second signal, and said third signal;

the second pairwise difference signal being a difference of a second pair of two signals selected from said first signal, said second signal, and said third signal;

the second pair being different from the first pair;

one of the first signal, said second signal, and said third signal being used both in the first pair and in the second pair, wherein the magnetic position sensor further comprises at least a fourth magnetic sensor adapted for measuring a respective value of said magnetic field, and having a fourth axis of maximum sensitivity parallel to the first axis and configured for providing a fourth signal, wherein the fourth magnetic sensor is arranged such that the third magnetic sensor is located substantially between the second magnetic sensor and the fourth magnetic sensor, and such that the first magnetic sensor, the second magnetic sensor, the third magnetic sensor, and the fourth magnetic sensor are arranged at the corners of an imaginary trapezium having a height over base ratio smaller than 30%;

wherein the processing unit is further connected to the fourth magnetic sensor for obtaining the fourth signal.

13. The position sensor arrangement according to claim 12, wherein the processing unit is adapted for determining a first value indicative of the relative position of the position sensor based on the first signal, the second signal, and the third signal obtained from the first magnetic sensor, the second magnetic sensor, and the third magnetic sensor; and wherein the processing unit is adapted for determining a second value indicative of the relative position of the position sensor based on the second signal, the third signal, and the fourth signal obtained from the second magnetic sensor, the third magnetic sensor, and the fourth magnetic sensor.

14. The position sensor arrangement according to claim 12, wherein the processing unit is further adapted for calculating a second ratio between a third difference being a difference between the two signals from the outer magnetic sensors, and a fourth difference being a difference between the two signals from the inner sensors; and wherein the processing unit is further adapted for determining a value of the constants C and the constant T, based on this second ratio.

15. A linear or angular position sensor device, comprising:

at least three magnetic sensors including a first magnetic sensor, a second magnetic sensor, and a third magnetic sensor, the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal;

the first magnetic sensor, the second magnetic sensor, and the third magnetic sensor being arranged on a straight line or at the corners of an imaginary triangle having a height over base ratio in the range from 1% to 45%;

a processing unit connected to the at least three magnetic sensors for obtaining the first signal, the second signal, and the third signal, and configured for determining a linear or angular position of the position sensor device relative to the magnetic field source based on an arctangent function of a ratio of a first pairwise difference and a second pairwise difference;

the first pairwise difference being a difference of a first pair of two signals selected from said first signal, said second signal, and said third signal; and the second pairwise difference signal being a difference of a second pair of two signals selected from said first signal, said second signal, and said third signal;

the second pair being different from the first pair; and one of the first signal, the second signal, and the third signal being used both in the first pair and in the second pair.

16. The linear or angular position sensor device according to claim 15, wherein the processing unit is adapted for calculating said relative position based on the formula: θ=arctan(R), wherein R=DIFF1/DIFF2, wherein DIFF1 is the first pairwise difference and DIFF2 is the second pairwise difference, wherein DIFF1=(H1−H2) or DIFF1=(H2−H1), wherein DIFF2=(H3−H2) or DIFF2=(H2−H3), wherein H1 is the first signal, H2 is the second signal, and H3 is the third signal.

17. The linear or angular position sensor device according to claim 15,
wherein the processing unit is adapted for calculating said relative position based on the formula: θ=arctan(R/C±T),
wherein R=DIFF1/DIFF2,
wherein DIFF1 is the first pairwise difference and DIFF2 is the second pairwise difference,
wherein DIFF1=(H1−H2) or DIFF1=(H2−H1),
wherein DIFF2=(H3−H2) or DIFF2=(H2−H3),
wherein H1 is the first signal, H2 is the second signal, and H3 is the third signal; and
wherein C is a predefined constant different from 1.0 and/or T is a predefined constant different from 0.0.

18. The linear or angular position sensor device according to claim 17,
wherein the value of C and T are calculated, based on the following formulas:

$$C=\cos(\varphi), \text{ and}$$

$$T=\tan(\varphi),$$

wherein φ is a constant value different from 0°.

19. The linear or angular position sensor device according to claim 15,
further comprising at least a fourth magnetic sensor adapted for measuring a respective value of said magnetic field, and having a fourth axis of maximum sensitivity parallel to the first axis and configured for providing a fourth signal,
wherein the fourth magnetic sensor is arranged such that the third magnetic sensor is located substantially between the second magnetic sensor and the fourth magnetic sensor, and such that the first magnetic sensor, the second magnetic sensor, the third magnetic sensor, and the fourth magnetic sensor are arranged on a straight line, or at the corners of an imaginary trapezium having a height over base ratio smaller than 30%;
wherein the processing unit is further connected to the fourth magnetic sensor for obtaining the fourth signal.

20. The linear or angular position sensor device according to claim 19,
wherein the processing unit is adapted for determining a first value indicative of the relative position of the position sensor based on the first signal, the second signal, and the third signal obtained from the first magnetic sensor, the second magnetic sensor, and the third magnetic sensor; and
wherein the processing unit is adapted for determining a second value indicative of the relative position of the position sensor based on the second signal, the third signal, and the fourth signal obtained from the second magnetic sensor, the third magnetic sensor, and the fourth magnetic sensor.

21. The linear or angular position sensor device according to claim 17,
wherein the processing unit is further adapted for calculating a second ratio between a third difference being a difference between the two signals from the outer magnetic sensors, and a fourth difference being a difference between the two signals from the inner sensors; and
wherein the processing unit is further adapted for determining a value of the constants C and the constant T, based on the second ratio.

22. The linear or angular position sensor device according to claim 18,
wherein the processing unit is further adapted for calculating a second ratio between a third difference being a difference between the two signals from the outer magnetic sensors, and a fourth difference being a difference between the two signals from the inner sensors; and
wherein the processing unit is further adapted for determining a value of the constant φ, based on the second ratio.

23. The linear or angular position sensor device according to claim 15,
wherein the magnetic sensors are horizontal Hall elements or vertical Hall elements.

24. A linear or angular position sensor arrangement, comprising:
a magnetic field source for generating a magnetic field having at least two poles;
the linear or angular position sensor device according to claim 15, movably arranged relative to the magnetic field source or vice versa.

25. The linear or angular position sensor arrangement according to claim 24,
wherein the first magnetic sensor, the second magnetic sensor, and the third magnetic sensor are located relative to the magnetic field source in such a way that the second signal is substantially equal to the first signal but phase shifted over a first predefined offset, and such that the third signal is substantially equal to the second signal but phase shifted over a second predefined offset.

26. The linear or angular position sensor arrangement according to claim 25, wherein the first predefined offset is substantially equal to the second predefined offset.

27. An angular position sensor arrangement according to claim 24,
wherein the magnetic field source is rotatable about a rotation axis; and
wherein a center of the at least three magnetic sensors is located offset from the rotation axis.

28. A method of determining a linear or angular position of a linear or angular position sensor device, the method comprising the steps of:
providing a linear or angular position sensor device, the position sensor device being movable relative to a magnetic field source having at least two poles, the position sensor device including
at least three magnetic sensors including a first magnetic sensor, a second magnetic sensor, and a third magnetic sensor,
the first magnetic sensor having a first axis of maximum sensitivity and configured for providing a first signal, the second magnetic sensor having a second axis of maximum sensitivity parallel to the first axis and configured for providing a second signal, and the third magnetic sensor having a third axis of maximum sensitivity parallel to the first axis and configured for providing a third signal;
the first magnetic sensor, the second magnetic sensor, and the third magnetic sensor being arranged on a straight line or at the corners of an imaginary triangle having a height over base ratio in the range from 1% to 45%;

a processing unit connected to the at least three magnetic sensors for obtaining the first signal, the second signal, and the third signal, and configured for determining a linear or angular position of the position sensor device relative to the magnetic field source based on an arctangent function of a ratio of a first pairwise difference and a second pairwise difference;

the first pairwise difference being a difference of a first pair of two signals selected from said first signal, said second signal, and said third signal; and the second pairwise difference signal being a difference of a second pair of two signals selected from said first signal, said second signal, and said third signal;

the second pair being different from the first pair; and one of the first signal, the second signal, and the third signal being used both in the first pair and in the second pair;

measuring a first value, a second value, and a third value of said magnetic field by means of the first magnetic sensor, the second magnetic sensor, and the third magnetic sensor, respectively;

calculating a first pairwise difference as a difference between a first pair of two signals selected from said first value, said second value, and said third value;

calculating a second pairwise difference signal as a difference between a second pair of two signals selected from said first value, said second value, and said third value, the second pair being different from the first pair, one of the first signal, the second signal, and the third signal being used both in the first pair and the second pair;

calculating a ratio between the first difference and the second difference; and determining by the processor the linear or angular position based on the arctangent function of said ratio.

* * * * *